(12) United States Patent
Sakamoto et al.

(10) Patent No.: US 6,912,452 B2
(45) Date of Patent: Jun. 28, 2005

(54) SYSTEM AND METHOD FOR PROVIDING CONTROL GAIN OF VEHICLE

(75) Inventors: Kiyoshi Sakamoto, Hiroshima-ken (JP); Shin Takehara, Hiroshima-ken (JP); Hiroshi Ohmura, Hiroshima-ken (JP); Shigefumi Hirabayashi, Hiroshima-ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 10/212,140

(22) Filed: Aug. 6, 2002

(65) Prior Publication Data

US 2003/0050742 A1 Mar. 13, 2003

(30) Foreign Application Priority Data

Aug. 7, 2001 (JP) ........................... 2001-239745
Aug. 7, 2001 (JP) ........................... 2001-239747

(51) Int. Cl.$^7$ .................................... G06F 7/00
(52) U.S. Cl. ................. 701/1; 701/25; 701/33; 701/35; 701/59
(58) Field of Search ................. 701/1, 25, 29, 701/33, 34, 35, 59; 707/6; 340/870.15

(56) References Cited

U.S. PATENT DOCUMENTS

| | | | |
|---|---|---|---|
| 5,521,823 A | * | 5/1996 | Akita et al. ............... 701/36 |
| 5,594,645 A | * | 1/1997 | Nishimura et al. ........ 701/96 |
| 5,812,070 A | | 9/1998 | Tagami et al. |
| 6,064,970 A | | 5/2000 | McMillan et al. |
| 6,449,572 B1 | | 9/2002 | Kurz et al. |

FOREIGN PATENT DOCUMENTS

| | | | |
|---|---|---|---|
| DE | 197 00 353 A | 7/1998 | |
| DE | 199 30 796 A | 1/2001 | |
| EP | 0 921 509 A | 6/1999 | |
| EP | 1 013 509 | 6/2000 | |
| EP | 1 035 530 | 9/2000 | |
| JP | 05-155276 | 6/1993 | |
| JP | 06206477 A | * 7/1994 | ........... B60K/41/00 |
| JP | 11-96229 | 4/1999 | |
| JP | 11 312291 A | 11/1999 | |
| JP | 2000 311287 A | 11/2000 | |

OTHER PUBLICATIONS

Patent Abstract of Japan vol. 1995, No. 02, Mar. 31, 1995, & JP 06 328986 A (Mazda Motor Corp) Nov. 29, 1994 *Abstract*.

* cited by examiner

*Primary Examiner*—Gertrude A. Jeanglaude
(74) *Attorney, Agent, or Firm*—Nixon Peabody LLP; Donald R. Studebaker

(57) ABSTRACT

A server for changing control gains of a vehicle is disclosed. The server includes a first receiver for receiving environment data obtained by vehicles of a plurality of users running in specific areas, and a second receiver for receiving learned data obtained by a plurality of users operating vehicles, and a storage device for accumulating the environment data and the learned data. The server further includes a transmitter for fetching environment data and learned data necessary to produce control gains from among the accumulated environment data and the learned data and transmitting the fetched environment data and learned data to a user requesting the environment data and the learned data. In a vehicle of the user, the control gains are newly produced and previously produced control gains are changed to the newly produced ones.

34 Claims, 30 Drawing Sheets

FIG.5

| PROGRAM | ACS | ABS | VGR | 4WS | TRC | EGC | PSC |
|---------|-----|-----|-----|-----|-----|-----|-----|
| A1 | 4 | 5 | 5 | 5 | 1 | 1 | 1 |
| A2 | 1 | 5 | 5 | 5 | 2 | 2 | 2 |
| A3 | 2 | 4 | 4 | 4 | 3 | 3 | 3 |
| A4 | 3 | 3 | 3 | 3 | 5 | 5 | 3 |
| A5 | 4 | 1 | 1 | 1 | 5 | 3 | 5 |
| A6 | 1 | 3 | 1 | 1 | 1 | 1 | 5 |
| A7 | 5 | 2 | 2 | 2 | 5 | 5 | 5 |
| B3 | 1 | 5 | 5 | 5 | 2 | 1 | 2 |

FIG.6

| PROGRAM | TERRAIN | ACS | ABS | VGR | 4WS | TRC | EGC | PSC |
|---|---|---|---|---|---|---|---|---|
| C1 | FREQUENT UP AND DOWN | L | H | L | L | L | — | L |
| C2 | BIG CURVE | H | L | H | H | L | H | L |
| C3 | STEEP SLOPE | — | — | — | — | H | H | — |

L ··· LOW VALUE
H ··· HIGH VALUE

FIG.7

| PROGRAM | OPERATION | ACS | ABS | VGR | 4WS | TRC | EGC | PSC |
|---|---|---|---|---|---|---|---|---|
| D1 | HIGH VEHICLE SPEED | H | L | L | L | L | H | H |
| D3 | HIGH STEER SPEED | H | — | H | H | — | — | H |
| D4 | GREAT YAWRATE CHANGE SPEED | H | — | H | H | — | — | H |
| D4 | GREAT YAWRATE CHANGE | H | — | L | L | — | H | H |
| D5 | HIGH ACCELERATION SPEED | H | — | — | — | L | H | — |
| D5 | HIGH BRAKING SPEED | H | H | — | — | — | — | — |
| D5 | HIGH CLUTCH OPERATION SPEED | H | — | — | — | L | H | — |
| D6 | HIGH SHIFTLEVER OPERATION SPEED | H | — | — | — | L | H | — |
| D2 | BRAKING PLACE, ACS, ABS ⋯ H | | | | | | | |
| D7 | MANUAL SWITCH OPERATION ⋯ CONTROL GAIN COMPENSATION | | | | | | | |

FIG.8

| PROGRAM | CIRCUMSTANCE, OPERATION | ACS | ABS | VGR | 4WS | TRC | EGC | PSC |
|---|---|---|---|---|---|---|---|---|
| E1 | NIGHT | L | H | L | L | L | L | L |
| E2 | BAD TRAFFIC | H | H | H | H | L | L | L |
| E3 | WIPER | L | H | L | L | L | L | H |
| E4 | LONG DRIVE | L | H | L | L | L | L | L |
| E5 | HIGH STEER SPEED | H | — | H | H | — | — | H |
| E5 | HIGH ACCELERATION SPEED | H | — | — | — | L | H | — |
| E5 | HIGH BRAKING SPEED | H | H | — | — | — | — | — |
| E6 | UNSTABLE RUNNING | H | H | L | L | L | L | H |
| E7 | MANUAL SWITCH OPERATION ⋯ CONTROL GAIN COMPENSATION | | | | | | | |

FIG.9

```
                    INFORMATION CONTRACT FORM
①NAVI  ☐ YES ☐ NO
DELIVERY MAP INFORMATION FOR NAVI SERVICE
 · INITIAL PURCHASE FEE OF $150 (NOT INCLUDING CELLULAR PHONE FEE)
 · MONTHLY FEE OF $50 (CHANGES BASED ON OPTIONAL ITEMS)
<OPTIONAL ITEMS>
 · ADVERTISEMENT INFORMATION DELIVERY   ☐ YES ☐ NO
   (ITEMS)
   ☐ RESTAURANT ADVERTISEMENTS  ▼ $5
   ☐ CAR DEALER ADVERTISEMENTS  ▼ $1/ONE DEALER
     (······, MAZDA, ··········)
   ☐ DEPARTMENT STORE ADVERTISEMENTS  ▼$3
   ☐ SPORTING GOODS SHOP ADVERTISEMENTS  ▼ $1
   ☐ ELECTRIC APPLIANCE AND PC ADVERTISEMENTS  ▼$2
   ☐ LEISURE FACILITY ADVERTISEMENTS  ▼ $4
   ☐ HOTEL AND ACCOMMODATION ADVERTISEMENTS  ▼ $3
   (DELIVERY TIME)
   ☐ FULL TIME  +0
   ☐ SATURDAY/SUNDAY/HOLIDAY  +35%
   ☐ APPOINTED TIME PERIOD  +10%
   (ADVERTISEMENT DELIVERY METHOD)
   ☐ ICON & MESSAGE  ▼ −
   ☐ SUPERIMPOSED WHEN VEHICLE APPROACHES ADVERTISER LOCATION  ▼5%
   ☐ CM AT NAVI STARTING TIME  ▼5%
   ☐ VOICE ANNOUNCEMENT  ▼10%
   (DELIVERY TIME)
   ☐ MORE THAN 10 HOURS PER WEEK
       MONTHLY CHARGE $25 (PENALTY $1 PER HOUR SHORT)

②MUSIC CONTRACT  ☐ YES ☐ NO
DELIVERY OF FAVORITE MUSIC
       MONTHLY FEE $5 (ADDITIONAL FEE FOR EVERY DELIVERY)
③ VIDEO CONTRACT  ☐YES ☐NO
DELIVERY OF FAVORITE VIDEO MOVIES
   MONTHLY FEE $5 (ADDITIONAL FOR EVERY VIDEO MOVIE DELIVERY)
④ INTERNET & E-MAIL CONTRACT  ☐YES ☐NO
ENABLE INTERNET ACCESS AND E-MAIL
   MONTHLY FEE $5
⑤ VEHICLE TROUBLESHOOTING CONTRACT  ☐YES ☐NO
REMOTE VEHICLE TROUBLESHOOTING SERVICE
   MONTHLY FEE $10
⑥ PERIODIC INSPECTION/CONSUMABLE PARTS REPORT CONTRACT  ☐YES ☐NO
REPORT ON TIME FOR PERIODIC INSPECTION AND REPLACEMENT OF EXPENDABLE PARTS
   MONTHLY FEE $0 (INTERNET & E-MAIL CONTRACT REQUIRED)
⑦ RUNNING SUPPORT/CUSTOMIZED CONTROL CONTRACT (NAVI CONTRACT REQUIRED)
   ☐YES ☐NO  CONTRACT PLANS: I  II  III
PROVIDE RUNNING ENVIRONMENT DATA (SPEED,ROAD SURFACE,ACTUAL IMAGE etc)
   CUSTOMIZED CONTROL
   I : MONTHLY FEE $20 (20CENTS PER DATA RECEPTION)
   II : MONTHLY FEE $10 (ENVIRONMENT DATA TRANSMISSION)
   III: MONTHLY FEE $5 (ENVIRONMENT DATA AND IMAGE DATA TRANSMISSION)
   ( II & III : 2CENT PER DATA RECEPTION  0CENT PER DATA RECEPTION)
```

SYSTEM AND METHOD FOR PROVIDING CONTROL GAIN OF VEHICLE

BACKGROUND OF THE INVENTION

1. Field of the Invention

The present invention relates to a system and method for providing control gain of a vehicle and, more particularly, to system and method for providing running characteristics of a vehicle which match the preferred drive feel and living environment of a driver by sharing environment data and learned data with a plurality of other drivers.

2. Description of the Related Art

Generally, control gains of vehicle running characteristics are provided so as to satisfy the driver's intention wherever the vehicle runs, whatever the circumstances are and whatever the driver's personality is.

It has been known to provide a vehicle with a manual switch for selecting a hard mode or a soft mode of an active suspension system and for a sporty mode or a normal mode of a four-wheel steering system by setting a specific control gain. This enables the vehicle running characteristic to match the driver's taste.

However, the conventional vehicle with such a manual switch cannot adequately satisfy the desires of all drivers. In view of this, a learning controlled vehicle has been proposed that uses learned driving characteristics of a driver for feedback control and changing the control gains of the vehicle running characteristics.

Japanese Patent Unexamined Publication No. 5-155276 discloses a learning controlled vehicle in which driving operations of a driver and the environment of the vehicle are learned and a control gain of a running characteristic of the vehicle is changed to match the preferred drive feel of the driver so that the driver is much more satisfied with the running characteristic of the vehicle.

However, since the conventional learning vehicle is such that driving operations of the driver and the circumstances of the vehicle are learned and the control gain of the running characteristics of the vehicle are changed based on the driving operation data and running characteristic data so as to obtain driving characteristics preferred by the driver, the vehicle needs to be provided with a large capacity storage device for storing all of the driving operation data and running characteristic data.

Further, since the conventional learning vehicle uses only its own learned data and the running characteristic data, learning sufficient for obtaining the most favorable control gain cannot be achieved.

Moreover, since the vehicle cannot obtain environment data of an area where the vehicle has never before run, the vehicle cannot obtain favorable control gain in such an area.

If a data learning vehicle could share and use learned data and environment data of other vehicles as its own data, the vehicle would be able to provide better control gains and obtain more favorable running characteristics. However, the inability of learning controlled vehicles to achieve such functions has not yet been perceived by those skilled in the art. Thus nothing specific has yet been proposed to solve such problems.

SUMMARY OF THE INVENTION

It is therefore an object of the present invention to provide a new-concept system and method that enable learned data and environment data to be shared by a plurality of drivers or users.

Another object of the present invention is to provide a server, a method and a program all for providing control gains of a vehicle that enables the vehicle to obtain running characteristics which match the preferred drive feel, living environment and driving operations of a user.

Still another object of the present invention is to provide a server, a method and a program all for providing control gains of a vehicle that enable the vehicle to run safely and comfortably by sharing learned data and environment data with a plurality of other users.

A further object of the present invention is to provide an information providing server, an information providing method and an information providing program.

Still a further object of the present invention is to provide an information collecting server, an information collecting method, and an information collecting program.

The present invention achieves the above objects by, in a first aspect, providing a server for changing control gains of a vehicle comprising first receiving means for receiving environment data obtained by vehicles of a plurality of users running in specific areas, second receiving means for receiving learned data obtained by a plurality of users operating vehicles, data accumulating means for accumulating the environment data and the learned data, and data transmitting means for fetching environment data and learned data necessary to produce control gains from among the accumulated environment data and the learned data, and transmitting the fetched environment data and learned data to a user requesting the environment data and the learned data so that, in a vehicle of the user, the control gains are newly produced and previously produced control gains are changed to the newly produced ones.

In a preferred embodiment of the present invention, the data accumulating means accumulates the learned data separately on the users, and accumulates the environment data separately on locations where the environment data are obtained.

In another preferred embodiment of the present invention, the environment data accumulated in the data accumulating means are accessible to any user.

In another preferred embodiment of the present invention, a user having an ID can access only his own learned data accumulated in the data accumulating means, and an unauthorized access to said learned data by a third party is prohibited.

In another preferred embodiment of the present invention, the environment data and learned data transmitted by the data transmitting means contain at least average learned data obtained by averaging the learned data of a plurality of users separately on predetermined characteristics.

In another preferred embodiment of the present invention, the data transmitting means transmits the environment data and the learned data together with locations and times where and when the environment data and the learned data were obtained.

In another preferred embodiment of the present invention, the server concludes a fee-based contract with the user.

In another preferred embodiment of the present invention, the fee-based contract provides that the user transmits his environment data and learned data to the server without charge, and receives the environment data and learned data from the server with a charge.

In another preferred embodiment of the present invention, the fee-based contract provides that, when the user permits transmission of his environment data and learned data, the fee in the fee-based contract is reduced.

In another preferred embodiment of the present invention, the environment data accumulated in the data accumulating means can be supplied to a third party.

The present invention in a second aspect provides a server for changing control gains of a vehicle comprising first receiving means for receiving environment data obtained by vehicles of a plurality of users running in specific areas, second receiving means for receiving learned data obtained by a plurality of users operating vehicles, data accumulating means for accumulating the environment data and the learned data, control gain producing means for producing control gains of control devices of a vehicle based on the accumulated environment data and learned data, and control gain transmitting means for transmitting the control gains to a user requesting the control gains so that, in a vehicle of the user, previously produced control gains are changed to the transmitted ones.

The present invention in a third aspect provides a server for providing a user with predetermined information by concluding a fee-based contract with the user, comprising first receiving means for receiving environment data obtained by vehicles of a plurality of users running in specific areas, second receiving means for receiving learned data obtained by respective users operating vehicles, data accumulating means for accumulating the environment data and the learned data, and means for providing a user requesting information with the information based on the accumulated environment data or learned data.

The present invention in a fourth aspect provides a server for collecting information comprising first receiving means for receiving environment data obtained by vehicles of a plurality of users running in specific areas, second receiving means for receiving learned data obtained by respective users operating vehicles, and data accumulating means for accumulating the environment data and the learned data.

The present invention in a fifth aspect provides a method for changing control gains of a vehicle comprising the steps of receiving environment data obtained by vehicles of a plurality of users running in specific areas, receiving means for receiving learned data obtained by a plurality of users operating vehicles, accumulating the environment data and the learned data, and fetching environment data and learned data necessary to produce control gains from among the accumulated environment data and the learned data, and transmitting the fetched environment data and learned data to a user requesting the environment data and the learned data so that, in a vehicle of the user, the control gains are newly produced and previously produced control gains are changed to the newly produced ones.

The present invention in a sixth aspect provides a method for changing control gains of a vehicle comprising receiving environment data obtained by vehicles of a plurality of users running in specific areas, receiving learned data obtained by a plurality of users operating vehicles, accumulating the environment data and the learned data, producing control gains of control devices of a vehicle based on the accumulated environment data and learned data, and transmitting the control gains to a user requesting the control gains so that, in a vehicle of the user, previously produced control gains are changed to the transmitted ones.

The present invention in a seventh aspect provides a method for providing a user with predetermined information by concluding a fee-based contract with the user, comprising receiving environment data obtained by vehicles of a plurality of users running in specific areas, receiving learned data obtained by respective users operating vehicles, accumulating the environment data and the learned data, and providing the user requesting information with the information based on the accumulated environment data or learned data.

The present invention in an eighth aspect provides a method for collecting information comprising receiving environment data obtained by vehicles of a plurality of users running in specific areas, receiving learned data obtained by respective users operating vehicles, and accumulating the environment data and the learned data.

The present invention in a ninth aspect provides a program for controlling a computer of a server for changing control gains of a vehicle, the program comprising instructions for receiving environment data obtained by vehicles of a plurality of users running in specific areas, instructions for receiving means for receiving learned data obtained by a plurality of users operating vehicles, instructions for accumulating the environment data and the learned data, and instructions for fetching environment data and learned data necessary to produce control gains from among the accumulated environment data and the learned data, and transmitting the fetched environment data and learned data to a user requesting the environment data and the learned data so that, in a vehicle of the user, the control gains are newly produced and previously produced control gains are changed to the newly produced ones.

The present invention in a tenth aspect provides a program for controlling a computer of a server for changing control gains of a vehicle, the program comprising instructions for receiving environment data obtained by vehicles of a plurality of users running in specific areas, instructions for receiving learned data obtained by a plurality of users operating vehicles, instructions for accumulating the environment data and the learned data, instructions for producing control gains of control devices of a vehicle based on the accumulated environment data and learned data, and instructions for transmitting the control gains to a user requesting the control gains so that, in a vehicle of the user, previously produced control gains are changed to the transmitted ones.

The present invention in an eleventh aspect provides a program for controlling a computer of a server for providing a user with predetermined information by concluding a fee-based contract with the user, the program comprising instructions for receiving environment data obtained by vehicles of a plurality of users running in specific areas, instructions for receiving learned data obtained by respective users operating vehicles, instructions for accumulating the environment data and the learned data, and instructions for providing the user requesting information with the information based on the accumulated environment data or learned data.

The present invention in a twelfth aspect provides a program for controlling a computer of a server for collecting information, the program comprising instructions for receiving environment data obtained by vehicles of a plurality of users running in specific areas, instructions for receiving learned data obtained by respective users operating vehicles, and instructions for accumulating the environment data and the learned data.

The present invention in a thirteenth aspect provides a server for changing control gains of a vehicle when a specific user operates a vehicle other than a vehicle owned by the specific user, the server comprising receiving means for receiving learned data obtained by a plurality of users operating their own vehicles, data accumulating means for accumulating the learned data, and means for providing the vehicle other than the vehicle owned by the specific user with predetermined learned data so as to change control gains in the vehicle other than the vehicle owned by the specific user.

In a preferred embodiment of the present invention, the server further comprises a rental car reservation system, and the vehicle other than the vehicle owned by the specific user is a rental car.

In another preferred embodiment of the present invention, the server further comprises confirmation means for, when the vehicle other than the vehicle owned by the specific user is not a rental car but a vehicle owned by another user, confirming that the specific user has obtained permission to use the vehicle owned by the other user.

In another preferred embodiment of the present invention, the learned data providing means provides the learned data of the specific user as the predetermined learned data when the learned data of the specific user is accumulated in the data accumulating means.

In another preferred embodiment of the present invention, the learned data providing means provides the learned data of other users as the predetermined learned data when learned data of the specific user is not accumulated in the data accumulating means.

In another preferred embodiment of the present invention, the learned data of other users provided by the learned data providing means are average learned data obtained by averaging the learned data of a plurality of users separately on predetermined characteristics.

In another preferred embodiment of the present invention, the predetermined learned data provided by the learned data providing means are obtained by correcting the received learned data by predetermined values on the safe side.

In another preferred embodiment of the present invention, the learned data providing means provides the learned data corrected based on difference in vehicle type between the vehicle of the specific user and the vehicle other than the vehicle owned by the specific user.

In another preferred embodiment of the present invention, the learned data receiving means does not receive the learned data obtained when the specific user operates the vehicle other than the vehicle owned by the specific user.

In another preferred embodiment of the present invention, the server further comprises second receiving means for receiving environment data obtained by a plurality of users operating their own vehicles in specific areas, the vehicles including the vehicle other than the vehicle owned by the specific user.

The present invention in a fourteenth aspect provides a method for changing control gains of a vehicle when a specific user operates a vehicle other than a vehicle owned by the specific user, the server comprising steps of receiving learned data obtained by a plurality of users operating their own vehicles, accumulating the learned data, and providing the vehicle other than the vehicle owned by the specific user with predetermined learned data so as to change control gains in the vehicle other than the vehicle owned by the specific user.

The present invention in a fifteenth aspect provides a program for controlling a computer of a server for changing control gains of a vehicle when a specific user operates a vehicle other than a vehicle owned by the specific user, the program comprising instructions for receiving learned data obtained by a plurality of users operating their own vehicles, instructions for accumulating the learned data, and instructions for providing the vehicle other than the vehicle owned by the specific user with predetermined learned data so as to change control gains in the vehicle other than the vehicle owned by the specific user.

The present invention in a sixteenth aspect provides a server for changing control gains of a vehicle when a user having a specific vehicle purchases another vehicle and replaces the specific vehicle with the other vehicle, the server comprising receiving means for receiving learned data, regarding control gains, obtained by the user operating the specific vehicle, data accumulating means for accumulating the learned data, and means for providing the other vehicle with predetermined learned data based on the accumulated learned data so as to change control gains in the other vehicle.

In a preferred embodiment of the present invention, the learned data providing means provides a vehicle manufacturer or a vehicle dealer of the other vehicle with the predetermined learned data, and the vehicle manufacturer or the vehicle dealer stores the predetermined learned data in the other vehicle.

In another preferred embodiment of the present invention, the predetermined learned data provided by the learned data providing means are obtained by correcting the received learned data by predetermined values on the safe side.

In another preferred embodiment of the present invention, the learned data providing means provides the learned data corrected based on difference in vehicle type between the specific vehicle and the other vehicle.

In another preferred embodiment of the present invention, the learned data accumulating means accumulates the corrected learned data.

The present invention in a seventeenth aspect provides a method for changing control gains of a vehicle when a user having a specific vehicle purchases another vehicle and replaces the specific vehicle with the other vehicle, the method comprising the steps of receiving learned data, regarding control gains, obtained by the user operating the specific vehicle, accumulating the learned data, and providing the other vehicle with predetermined learned data based on the accumulated learned data so as to change control gains in the other vehicle.

The present invention in an eighteenth aspect provides a program for controlling a computer of a server for changing control gains of a vehicle when a user having a specific vehicle purchases another vehicle and replaces the specific vehicle with the other vehicle, the program comprising instructions for receiving learned data, regarding control gains, obtained by the user operating the specific vehicle, instructions for accumulating the learned data, and instructions for providing the other vehicle with predetermined learned data based on the accumulated learned data so as to change control gains in the other vehicle.

Further objects, features and advantages of the present invention will become apparent from the Detailed Description of Preferred Embodiments which follows when read in light of the accompanying Figures.

BRIEF DESCRIPTION OF THE DRAWINGS

In the accompanying drawings:

FIG. 5 is a table showing various control data for configuration programs A1 through A7 and a standard program B3;

FIG. 6 is a table showing control data for the learning programs C1 through C3;

FIG. 7 is a table showing control data for the learning programs D1 through D7;

FIG. 8 is a table showing control data for modification programs E1 through E7;

FIG. 9 is an example of an information center agreement;

DETAILED DESCRIPTION OF THE PREFERRED EMBODIMENTS

Preferred embodiments of the present invention will now be explained with reference to the drawings.

Figure 1:
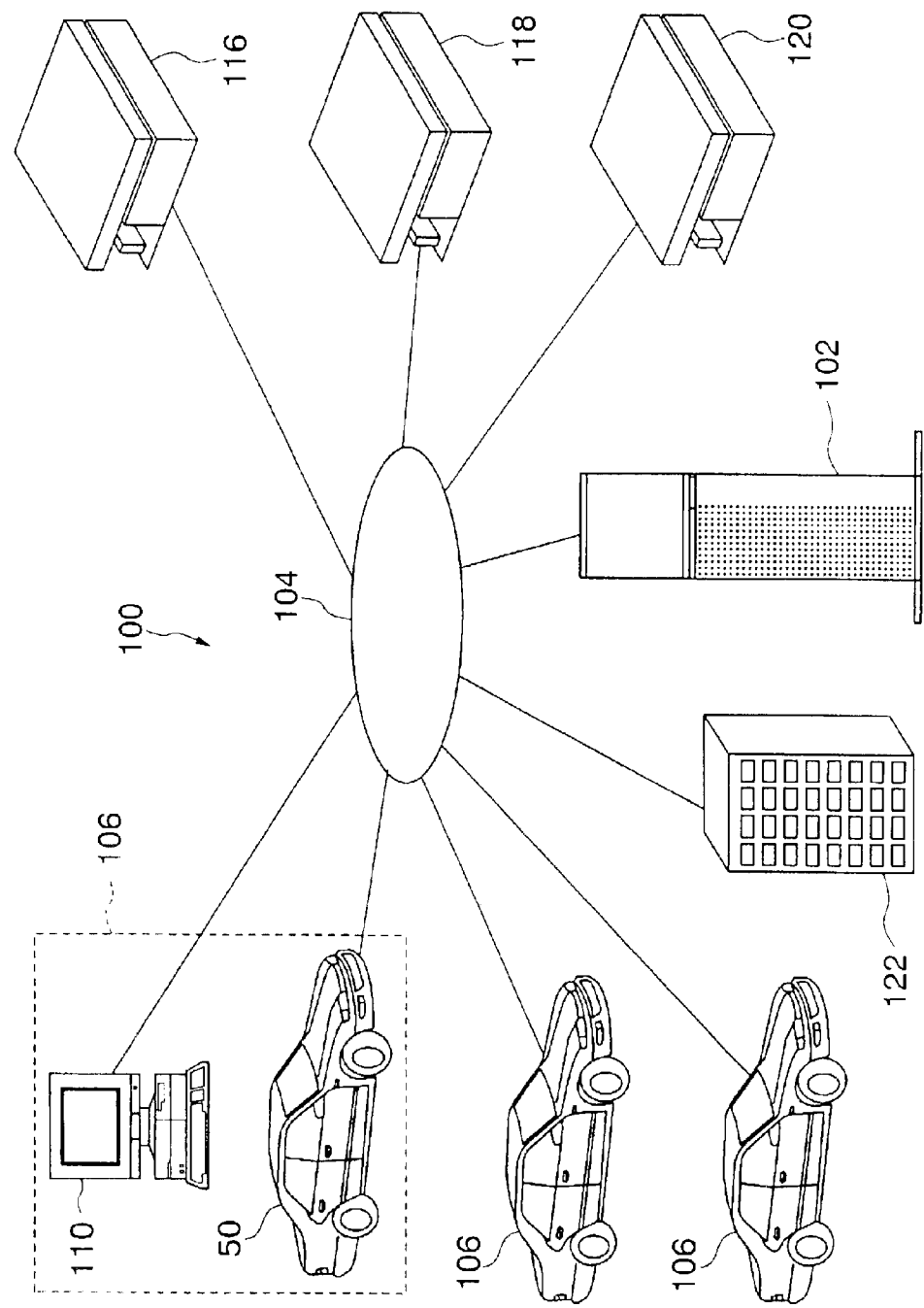
FIG. 1 is a schematic view showing a system for providing control gains of a vehicle in which a server for providing control gains of a vehicle according to the present invention can be applied.

FIG. 1 is a schematic view showing a system for providing control gains of a vehicle in which a server for providing control gains of a vehicle according to the present invention can be applied.

Referring to FIG. 1, a vehicle control gain providing system 100 comprises an information center 102 which works as a server for providing control gains of a vehicle. Many users (drivers) 106 who have signed up for services from the information center 102 explained below are connected through a network 104 such as the Internet 104 to the information center 102.

The user (driver) 106 may own an onboard central control unit 50, a home computer 110, a mobile phone (not shown) and a personal digital assistant (PDA) (not shown).

The information center 102 is connected through the network 104 to a car maker 116, a car dealer 118, a rental car agent 120 and the like. The information center 102 is also connected to a traffic information center 122 that provides traffic information such as traffic restriction information and traffic jam and traffic condition information. The user 106 and the information center 103 can use the traffic information through the network 104.

The information center 102 includes a host computer (not shown) and a database storing various data which will be explained below. The database of the information center 102 stores various data such as learned data and environment data (see FIG. 12) for implementing driving support and customized control when they are concluded. The database of the information center 102 further stores map information, advertising information, music information, video information, a vehicle troubleshooting program, a periodic inspection/expendable parts report program, and the like so as to provide the user or driver with various information provided in the information center agreement (see FIG. 9).

Figure 2:
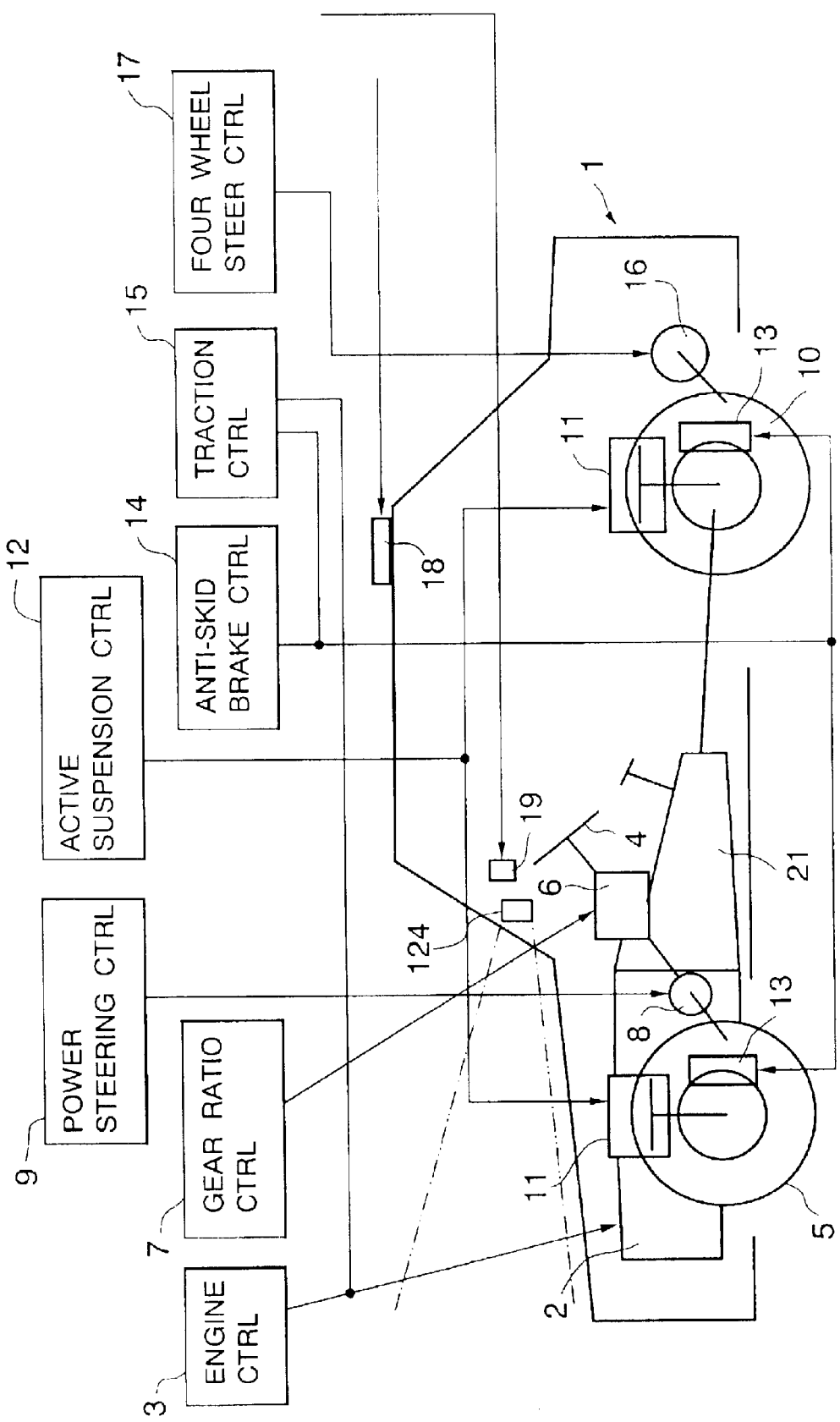
FIG. 2 is a block diagram of a learning controlled vehicle to which an embodiment of the present invention can be applied.

FIG. 2 is a block diagram of a learning controlled vehicle to which an embodiment of the present invention can be applied.

As shown in FIG. 2, a learning controlled vehicle 1 is provided with an engine 2, an engine control device 3 for controlling the amount of intake gas, ignition timing and fuel injection, a gear ratio change device 6 for changing the steering angle ratio of front wheels 5 by a steering wheel 4, a gear ratio control device 7 for controlling the gear ratio change device 6, a power steering control device 9 for controlling a power steering device 8, an active suspension control device 12 for controlling an active suspension 11 for front wheels 5 and rear wheels 10, an anti-skid brake control device 14 for controlling a brake system 13 for the front and rear wheels 5 and 10, a traction control device 15 for controlling the engine 2 and brake system 13, and a four wheel steering control device 17 for controlling a four wheel steering device 16 which steers the rear wheels 10. In the drawing, the reference numeral 18 designates a location detecting sensor which receives a signal, such as magnetism from the earth, and other signals from satellites, sign posts (not shown) and the like to detect the location of the vehicle 1. The reference numeral 19 designates a display device for showing the location of the vehicle running on a map or the like.

The learning controlled vehicle 1 is further provided with a web camera 124 which is mounted at a front side of a passenger compartment for taking a photograph of a front view seen from a vehicle at any time. The web camera 124 has a storing device such as a HDD and updates the image data of the image photographed every predetermined time interval such as ten minutes.

Figure 3:
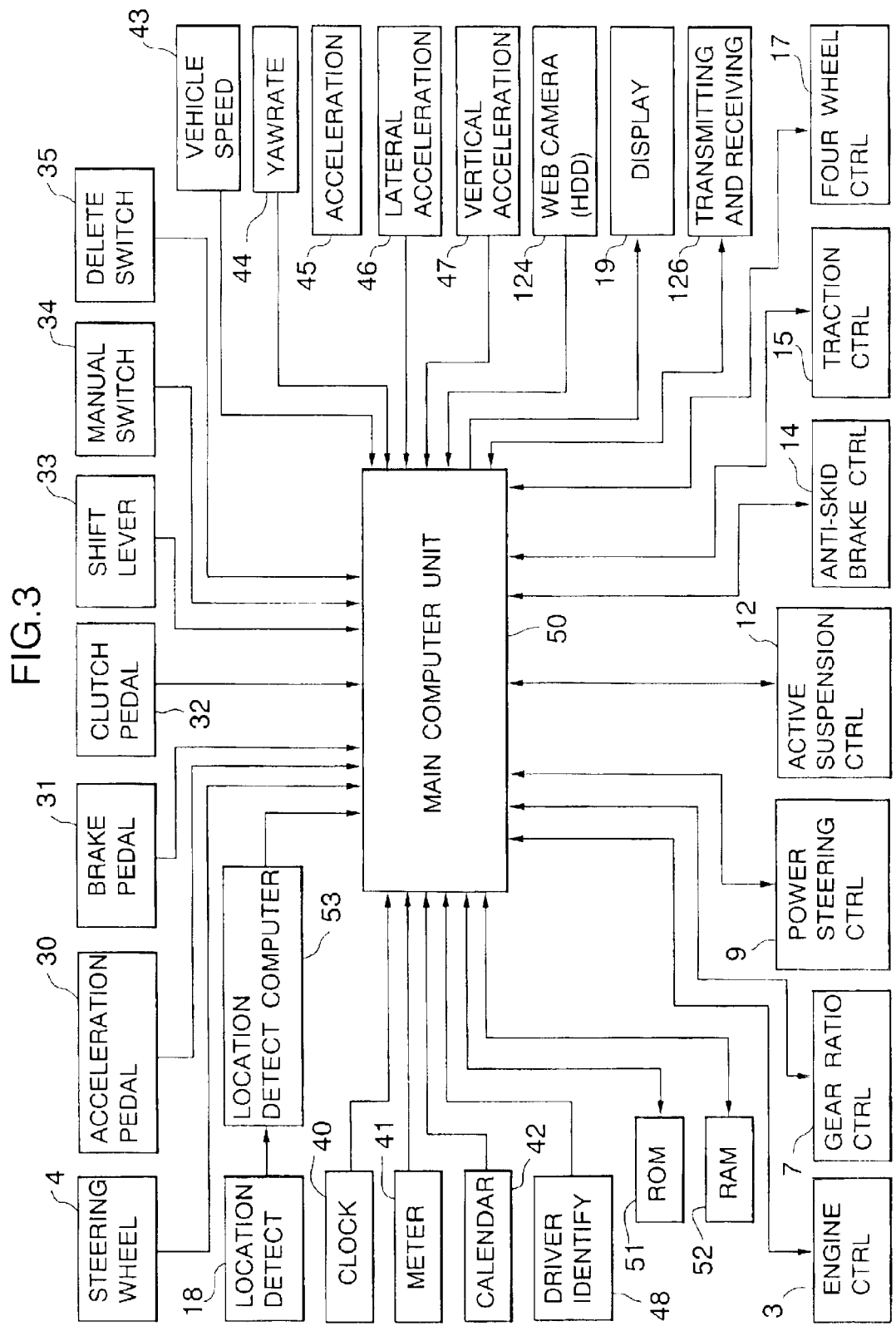
FIG. 3 is a block diagram showing an operation, detection and control system of the learning controlled vehicle.

FIG. 3 is a block diagram showing an operation, detection and control system of the learning controlled vehicle. As shown in FIG. 3, the learning controlled vehicle 1 is operably provided with the steering wheel 4, an acceleration pedal 30, a brake pedal 31, a clutch pedal 32, a shift lever 33, a manual switch 34 for manually changing the control gains and a delete switch 35 for deleting and enabling rewriting of a program which is stored in a RAM 52. When the vehicle 1 is sold to another person, the control program needs to be rewritten because the driver changes and the learned driver information is no longer useful. Under these circumstances, the program can be deleted by the delete switch 35 so as to collect new information on the new driver. Normally, the delete switch 35 is accessible only by authorized persons such as, for instance, a dealer, a car maker and the like.

The vehicle 1 is also provided with a location detecting sensor 18, a clock 40, a distance meter 41 for detecting running distance of the vehicle 1, a calendar 42, a vehicle speed sensor 43 for detecting vehicle speed V, a yaw rate sensor 44 for detecting yawing rate of the vehicle 1, an acceleration a sensor 45 for detecting vehicle acceleration, a lateral acceleration sensor 46 for detecting sidewise acceleration GL of the vehicle 1, a vertical acceleration sensor 47 for detecting vertical acceleration GV of the vehicle 1, and a driver identifying device 48 for identifying the driver by reading out data on the driver from an IC card. Alternatively, the driver identifying device 48 identifies the driver by means of articles of the driver, such as, a key, a license, a watch or the like. The engine control device 3, the gear ratio control device 7, the power steering control device 9, the active suspension control device 12, the anti-skid brake control device 14, the traction control device 15 and a four wheel steer control device 17 are provided with timers. A display device 19 is also provided for displaying various information for guiding the driver.

Further, the control system of the vehicle 1 is provided with a central or main computer unit 50, a ROM 51 which stores a predetermined program, a RAM 52 which stores a program which can be rewritten, a computer unit 53 for detecting the location of the vehicle 1 based on the signal from the location detecting sensor 18, the engine control device 3, the gear ratio control device 7, the power steering control device 9, the active suspension control device 12, the anti-skid brake control device 14, the traction control device 15 and the four wheel steer control device 17.

The main computer unit 50 has access to programs stored in the ROM 51 and the RAM 52 and receives signals from the steering wheel 4, the acceleration pedal 30, the brake pedal 31, the clutch pedal 32, the shift lever 33, the manual switch 34, the delete switch 35, the location detecting sensor 18, the clock 40, the meter 41, the calendar 42, the vehicle speed sensor 43, the yaw rate sensor 44, the acceleration sensor 45, the lateral acceleration sensor 46, the vertical acceleration sensor 47 and the driver identifying sensor 48 and produces signals to the engine control device 3, the gear ratio control device 7, the power steering control device 9, the active suspension control device 12, the anti-skid brake control device 14, the traction control device 15 and the four wheel steer control device 17.

Control gains for the engine control device 3, the gear ratio control device 7, the power steering control device 9, the active suspension control device 12, the anti-skid control device 14, the traction control device 15 and the four wheel steer control device can be changed by means of the operation of the manual switch 34.

The learning controlled vehicle 1 is further provided with a transmitting and receiving device 126 for transmitting/receiving various information to/from the information center 102 through the network 104.

Under normal running conditions, the main control unit 50 determines control gains based on which the respective control devices are operated. When a learning control is carried out, the main control unit 50 determines control gains by using necessary programs stored in the ROM 51 and the RAM 52, determines learning values so as to update the information stored in the RAM 52, and further operates the respective control devices 3, 7, 9, 12, 14, 15 and 17.

Further, as explained below, the vehicle 1 may determine control gains by using learned data and environment data of other users received from the information center 102, and may change control gains by receiving and using control gains produced by the information center 102.

Figure 4:
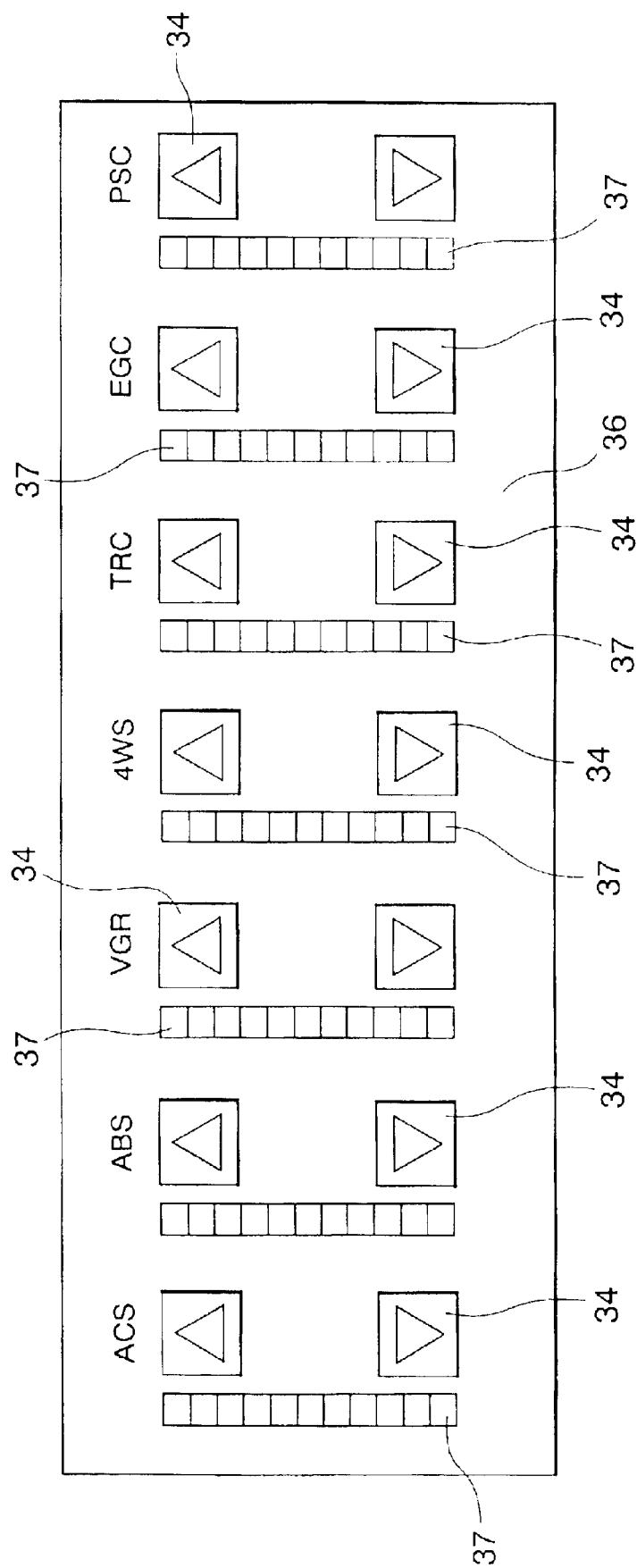
FIG. 4 is a front view of an instrument panel with a manual switch.

FIG. 4 shows an instrument panel 36 on which the manual switch 34 is disposed, wherein the reference numeral 37 designates an indicator.

Next, the various programs stored in the ROM 51 and the RAM 53 of the learning controlled vehicle 1 will be explained. These programs are also stored in the database of the information center 102 (see FIG. 12) and used in the information center 102 in the same manner.

The ROM 51 stores a configuration program A1 for a metropolis area drive, a configuration program A2 for an urban area drive, a configuration program A3 for a suburban area drive, a configuration program A4 for a mountain area drive, a configuration program A5 for a freeway drive, a configuration program A6 for driving on a road whose frictional coefficient $\mu$ is not greater than a predetermined value and a configuration program A7 which is used when the lateral acceleration of the vehicle 1 is greater than a predetermined value such as 0.5G so as to improve the running stability.

The RAM 52 stores the configuration programs A1 through A5 when the vehicle is driven for the first time or after the delete switch 35 is operated. As the vehicle 1 is driven by a specific driver, such as the vehicle owner or a member of his family, the configuration programs A1 through A5 stored in the RAM 52 are modified for the specific driver into standard programs B1 through B5 by modifying programs E5 through E7.

The configuration programs A1 through A5 are used when the vehicle 1 is driven by a driver other than the specific driver or when the specific driver is not identified by the driver identifying device 48 an IC card or the like. One of the configuration programs A1 through A5 is selected as a result of the detection of the area type where the vehicle 1 runs. The area is judged by the main computer 50 based on a navigation signal from the computer unit, 53 which receives the signal from the location detecting device 18. It will be understood that the location detecting device 18 can be either a navigation system which provides the location of the vehicle automatically or a manual device such as a manual switch through which the driver inputs the location of the vehicle manually. Meanwhile, when the vehicle 1 is driven for the first time, or just after the delete switch 35 is operated, the configuration programs will be used even when the specific driver drives the vehicle 1 since the RAM 52 stores the configuration programs A1 through A5 virtually.

The configuration programs A6 and A7 are used prior to the standard programs B1 through B5 when the vehicle 1 runs on a road whose frictional coefficient $\mu$ is not greater than a predetermined value and when the lateral acceleration GL is greater than a predetermined value such as 0.5G so that running stability can be obtained.

The configuration programs A1 through A5 stored in ROM 51 are duplicated and stored in the RAM 52 as an initial form of the standard programs B1 through B5 when the vehicle 1 is driven for the first time or just after the delete switch 35 is operated. Then, the configuration programs A1 through A5 stored in the RAM 52 are modified as the vehicle 1 is driven and changed to learned standard programs B1 through B5. The programs B1, B2, B3, B4 and B5 are provided for a metropolis area drive, an urban area drive, an suburban drive, a mountain area drive, and a freeway drive respectively. When the specific driver drives the vehicle 1, one of the programs B1 through B5 is selected and used based on the signal from the location detecting device 18, which is processed in the computer units 50 and 53 for detecting the terrain where the vehicle 1 is running.

The RAM 52 stores learning programs C1 through C3 and D1 through D7 which are used prior to the standard programs B1 through B5 when the vehicle 1 runs within a specific area, for example, an area within 20 km from the owner driver's house, or from a dealer's office. The specific area is detected by utilizing the location detecting device 18 as well.

The learning programs C1 through C3 learn the terrains of roads in the specific area for every unit zone. The program C1 learns the road surface condition with regard to the vertical or up and down movement and vibration of the vehicle or the pitching of the vehicle in the specific area for every unit zone based on the vertical acceleration GV of the vehicle 1 detected by the vertical acceleration signal 47. The programs C2 and C3 learn the curve and slope of the roads for every unit zone respectively.

The learning programs D1 through D7 learn the driver's operations for the unit zone in the specific area with regard to the day of the week and a predetermined hourly period, such as every 3 hours of the day. The program D1 learns the vehicle speed V for the unit zone of the specific area, the day of the week and the predetermined hourly period of the day. The program D2 learns the location where braking is effected. The program D3 learns the driver's operation of the steering wheel 4. The programs D4 and D5 learn the mean yaw rate Y for the unit zone of the road, the driver's operation of the acceleration pedal 30, the brake pedal 31 and the clutch pedal 32. The programs D6 and D7 learn the driver's operation of the shift lever 33 and the location where the manual switch 34 is operated.

The unit zone is defined as, for example 1 km, of road length wherein the adjacent unit zones have an overlapped road length of, for example, 100 m. Alternatively, the unit zone may be defined as the distance traveled during 10 minutes of vehicle 1 running wherein adjacent unit zones have an overlapped portion of 1 minute running of the vehicle 1.

When the vehicle 1 has run a predetermined number of the times, such as 10 times or 50 times, on the same unit zone of the same road on the same day of the week in the same hourly period, initial mean values for the terrain of the road are created and stored in the RAM 52. Likewise, initial programs D1, D3 through D6 are created and stored in the RAM 52. When the vehicle has run the predetermined number of times in the same manner as aforementioned, mean values of the driver's operation of the brake pedal 31 and the manual switch 34 where the operation is made at the same place are calculated to create initial programs D2 and D7, which are stored in the RAM 52. In this case, if the brake pedal 31 is operated more than once within 5 m distance or if the manual switch 34 is operated more than once within 10 m distance, such operations are deemed to occur at the same place.

Modification programs E1 through E7 are provided for modifying the programs B1 through B5, C1 through C3 and D1 through D7.

The program E1 uniformly modifies the standard programs B1 through B5 when the main computer 50 detects nighttime based on a signal from the clock 40. The program E2 uniformly modifies the programs B1 through B5, C1 through C3 and D1 through D7 when the computer unit 50 detects a bad traffic condition. The program E3 uniformly modifies the programs B1 through B5, C1 through C3 and D1 through D7 when the computer unit 50 detects snowy or rainy weather condition based on a signal from a wiper or the like. The program E4 uniformly modifies the programs B1 through B5, C1 through C3 and D1 through D7 when the computer unit 50 detects that continuous driving time exceeds a predetermined period. The modification programs E1 through E4 are created based on empirical or theoretical data and stored in the RAM 52.

The modification program E5 modifies the standard programs B1 through B5 based on the features of the specific driver's operation of the steering wheel 4, the acceleration pedal 30 and the brake pedal 31 based on the operation speed of the steering wheel 4, the acceleration pedal 30 and the brake pedal 31 calculated by the main computer 50. When the main computer 50 detects instability of vehicle running, the program E6 uniformly modifies the programs B1 through B5, C1 through C3 and D1 through D7. The program E7 modifies the programs B1 through B5 in accordance with the operation of the manual switch 34.

The program E6 is created empirically and/or theoretically and stored in the RAM 52. In forming the program E5, mean values of the operation speed of the steering wheel 4, the acceleration speed 30 and the brake pedal 31 are calculated for the same areas, namely, a metropolis area, an urban area, a suburban area, a mountain area and a freeway area and stored in the RAM 52 when the vehicle has run a predetermined number of times, such as 100 times or 200 times within the same area. The initial program E7 is created in accordance with a mean value of operation of the manual valve 34 when the vehicle 1 has run the predetermined number of times in the same area.

It will be understood that the programs E1, E3 and E7 are not used for modifying the programs C1 through C3 and D1 through D7 but for modifying the programs B1 through B5. There is no need for modification by the programs E1, E5 and E7 on the programs C1 through C3 and D1 through D7 because they were created taking account of the features of the driver's operation for every unit zone on the same day of the week in the same hourly period of the day.

The learning programs C1 through C3, D1 through D7 and modification programs E5 through E7 store the detected data. For example, the program C1 stores the vertical acceleration GV. The program C2 stores the lateral acceleration GL.

In FIG. 5, there are shown ratios of control data stored in the configuration programs A1 through A7 which are stored in the ROM 51 and ratios of the control data stored in the standard program B3 which is stored in the RAM 52.

In FIG. 5, ACS, ABS, VGR, 4WS, TRC, EGC and PSC are ratios of the control data between the programs A1 through A7 and B3 for the active suspension control device 12, the anti-skid brake control device 14, the gear ratio control device 7, the four wheel steer control device 17, the traction control device 15, the engine control device 3 and the power steering control device 9, respectively.

These ratios of the data are processed taking account of coefficients for the respective control devices so that actual control data can be obtained. If ACS takes a value of 1, the softest suspension characteristic can be obtained. Conversely, an ACS value of 5 provides the hardest suspension characteristic.

An ABS value of 1 provides the weakest control for the anti-skid control system in which the anti-skid control is relatively suppressed. An ABS value of 5 provides the strongest control in which the anti-skid control is relatively facilitated. A VGR value of 1 provides the greatest gear ratio while a value of 5 provides the smallest gear ratio. A 4WS value of 1 provides the strongest tendency for the rear wheels to be steered in the same direction as the front wheels. A 4WS value of 5 provides the strongest tendency for the rear wheels to be steered in the opposite direction to the front wheels. A TRC value of 1 provides the weakest traction control for suppressing slip of the wheels while a value of 5 provides the strongest traction control. An EGC value of 1 provides an engine control for the best fuel consumption efficiency. An EGC value of 5 provides an engine control for most powerful output. APSC value of 1 provides the strongest assistance for the steering operation while a value of 5 provides the weakest assistance for the operation.

These control data for controlling the running characteristics of the vehicle 1 are determined so as to satisfy the driver as much as possible.

In the configuration program A4 for the metropolis area drive, the ACS is set to a value of 4 to provide a relatively hard suspension characteristic. In the metropolis area drive, start and stop operations are frequently repeated because of bad traffic conditions and numerous traffic lights. Thus, the harder characteristic improves riding comfort because squat and dive of the vehicle 1 resulting from the start and stop operations can be suppressed as low as possible. On the other hand, in the configuration program A2 for urban area drive, the ACS is set to the smallest value of 1 to provide the softest suspension characteristic. In the urban area, the vehicle speed increases in comparison with the metropolis area. But, this increase of the vehicle speed is not particularly large and running stability can be maintained. In view of this, the ACS is set to the smallest degree in quest of riding comfort. In the configuration program A3 for the suburban area drive, the ACS is set to a value 2 because the vehicle speed markedly increases to lower the running stability. In the configuration programs A4 and A5, the value is further increased to 3 and 4, respectively, to make the suspension characteristic harder so as to improve the running stability taking account of the considerable increase in the vehicle speed. In the configuration program A6 for the low friction road drive, the ACS is set to the smallest value of 1 to provide the softest suspension characteristic. In the configuration program A7, which is used when the lateral acceleration of the vehicle is greater than a predetermined value such as 0.5, the ACS is set to the largest value of the 5 to provide the hardest suspension characteristic and improve the running stability.

The ACS value is modified for the standard program B3 as shown when the driver makes a moderate operation.

FIG. 6 shows how the control data for the programs C1 through C5 are determined in accordance with the terrain within the specific area. FIG. 7 shows how the control data for the programs D1, D3 through D6 are determined in accordance with the driver's operations for every unit zone in the specific area, and how the control data for the programs D2 and D7 are determined in accordance with the driver's operations at each unit zone.

FIG. 8 shows how the control data for the programs B1 through B5, C1 through C3 and D1 through D7 are modified by utilizing the modification program E1 through E7.

Modification based on the driver's operations is made with reference to a map stored in the computer 50 in FIGS. 6, 7 and 8. In FIGS. 6 and 7, "large" means that the control data are modified by a relatively large extent. "Small" means that the control data are modified by a relatively small extent.

Figure 12:
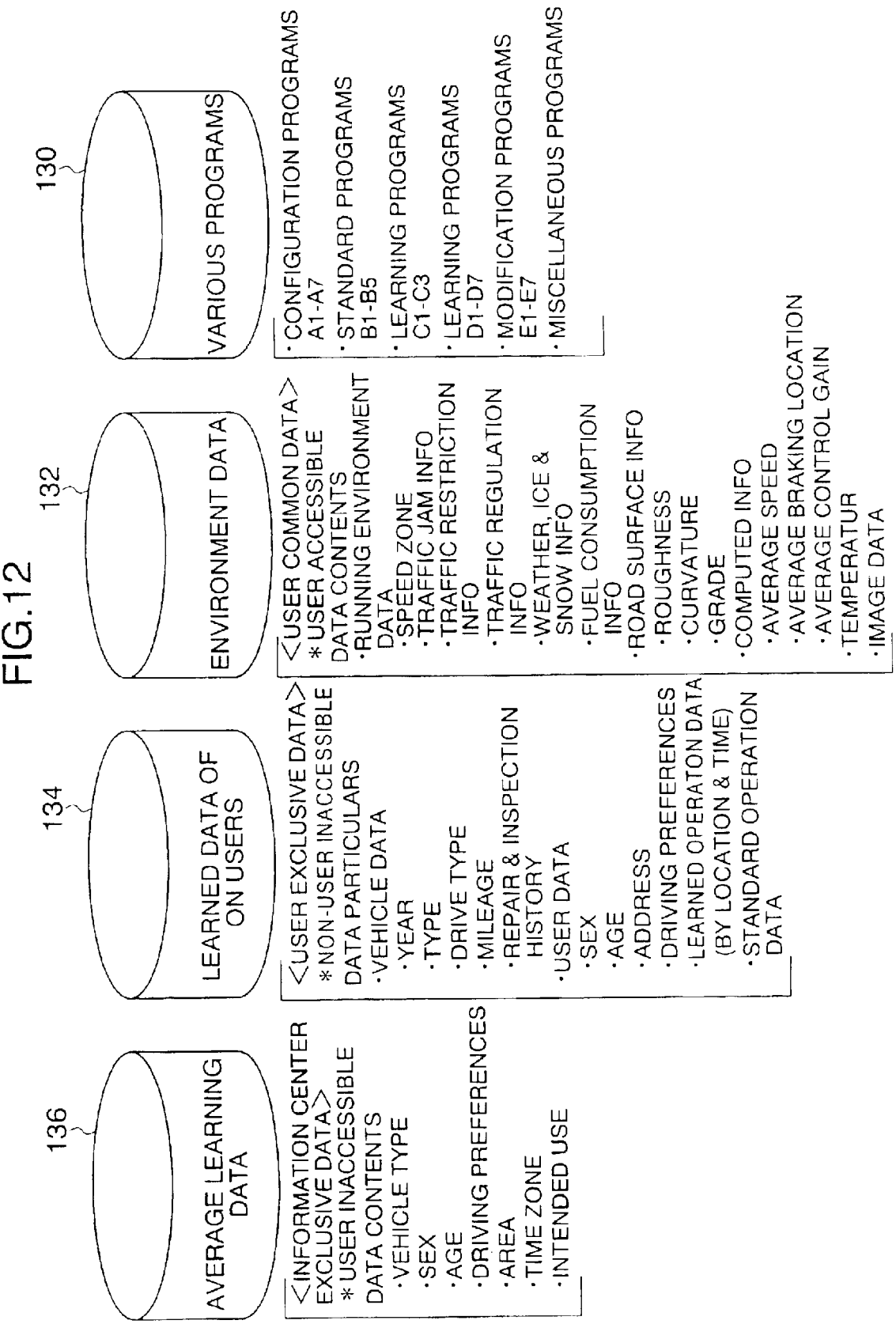
FIG. 12 is a diagram showing particulars of data stored in a database of an information center.

Next, the information center 102 collects learned data on many users (or members signed up with the information center) and environment data on specific areas obtained by vehicles of the users running in the specific area, and stores both the learned data and the environment data on the specific areas in a storage device (see FIG. 12). The users or the members signed up with the information center 102 can share these two kinds of data by concluding a fee-based contract in advance with the information center 102. Namely, the user can receive the learned data and the environment data of a plurality of other users from the information center 102 and can change control gains to more favorable ones in the control devices of the vehicle. The information center 102 provides the control gains based on these two kinds of data and the user can also receive the control gains provided by the information center 102 so as to change the control gains to more favorable ones (see "Running Support/Customized Control Agreement" in FIG. 9).

The contract is normally concluded in writing at a car dealer when the user or driver purchases the motor vehicle. However, the driver or user may conclude a fee-based contract with the information center 102 through the network 104 using the main control system 50 or the home computer 110 when or after purchasing the motor vehicle.

FIG. 9 is an example of an information center agreement form. The contents of the agreement will be explained with reference to FIG. 9. The information center agreement basically includes two sections: (1) a navigation or NAVI agreement and (2)–(7) other agreements.

First, the NAVI agreement will be explained. The NAVI agreement covers the delivery of map information to a navigation system (basic agreement) and the delivery of advertisement information to the system (optional agreement).

The NAVI agreement includes an initial purchase fee of $150 for the navigation system and a monthly fee of $50 that is changed based on optionally selected items.

Next, when optional agreements are made, the following various items may be selected and the monthly fee of $50 will be changed. Namely, when an agreement is concluded for delivery of "Advertisement Information" and then one or more of "Restaurant Advertisements," "Car Dealer Advertisements," "Department Store Advertisements," "Sporting Goods Shop Advertisements," "Electric Appliance and PC Advertisements," "Leisure Facility Advertisements" and "Hotel and Accommodation Advertisements" are selected, the monthly fee of $50 is reduced. For example, when "Restaurant Advertisements" is selected $5 is deducted from the monthly fee of $50. Similarly, when other items are selected, amounts of money corresponding to the items in FIG. 9 are deducted from the monthly fee of $50.

Next, when one or more optional contacts are made and "Full Time Delivery," which provides information delivery from the information center 102 on a full-time basis, is further selected, the monthly fee remains unchanged from that after the deductions made based on the optionally selected items. However, when "Saturday, Sunday and Holiday Delivery," which provides information delivery from the information center 102 only on Saturdays, Sundays and holidays, is further selected, the monthly fee is increased 35%. Further, when "Appointed Time Period 10 a.m.–5 p.m.," which provides information delivery only during the appointed time period of 10 a.m. to 5 p.m., is selected, the monthly fee is increased 10%.

Further, when "Icon & Message," which uses icons and messages for display regarding the distribution of "Advertisement Information," is further selected, the monthly fee remains unchanged from that after the amounts deducted based on the optionally selected items. When "Superimposed When Vehicle Approaches Advertiser Location," which displays superimposed information when the vehicle approaches an object related to a selected item, is further selected, the monthly fee is reduced 5%. When "CMNAVI at Starting Time," which displays objects related to the selected items when the navigation system is started, is further selected, the monthly fee is further reduced 5%. When "Voice," which provides information about objects related to the selected items by a voice announcement, is further selected, the monthly fee is still further reduced 10%.

When an agreement is concluded for delivery of "Advertisement Information" and for "More Than 10 Hours Delivery per Week" is further selected, the monthly fee of $50 is reduced 50% to $25. As a result, the owner is likely to positively view the advertisement information. However, if the owner or driver does not use the navigation system for 10 or more hours a week, a penalty of $1 per hour under ten hours is added to the reduced monthly fee of $25.

Accordingly, by concluding NAVI agreements the information center 2 can considerably defray the initial cost of the high-performance navigation system 43 (the above-mentioned $150) and further secure operating funds in the form of the monthly agreement fees, which increase in proportion to the number of agreements with customers.

Further, since the customers (users) can select the distributed advertisement types based on their preferences, advertisements of no interest to the owners are not displayed on the navigation system. Since only necessary advertisement information is distributed, the owners can effectively utilize the advertisement information and can further reduce the monthly fee of the NAVI agreement. Regarding this, although the monthly fees are reduced when customers or users make optional agreements, the information center 102 can collect advertising fees from the companies that place the advertisements and, therefore, can secure a much greater amount of operating funds in total from the customers (users) and advertisers in combination. Thus, the information center 102 can also secure sufficient operating funds from this aspect.

When the delivery time is limited, the monthly fee increases but the customers (users) can use the navigation system according to their lifestyles. The advertisers are charged higher advertising fees when the customers select full time delivery. When limited day or time delivery is selected, the advertisers are charged lower advertising fees while the customers (users) are charged higher monthly fees. Overall, therefore, the information center 102 can secure a satisfactory amount of income.

Further, when an agreement is concluded for "More Than 10 Hours Delivery per Week" based on the distribution of "Advertisement Information," the monthly fee is considerably reduced. The owners are therefore likely to positively view the advertisement information displayed on the navigation system. On the other hand, when the navigation system is not used for at least the predetermined number of hours a week (10 hours), the owners have to pay penalties. The monthly fees from the owners therefore increase. Further, the information center can charge advertisers relatively high advertising fees on the basis of owner use of at least the predetermined number hours a week.

Next, aspects of the information center agreement other than the NAVI agreement will be explained with reference to FIG. 9. The information center agreement further includes a "Music Agreement," a "VIDEO Agreement," an "Internet & E-Mail Agreement," a "Vehicle Online Troubleshooting Agreement," a "Periodic Inspection/Expendable Parts Report Agreement" and a "Running Support/Customized Control Agreement". The customers (users) may select some of such agreements based on their preferences and needs. When making these agreements other than the NAVI agreement, additional monthly fees need to be paid in addition to the monthly fee of $50 for the NAVI agreement (which may change depending on selected options).

The respective customers (users) may enjoy the various contents based on their preferences and needs by paying the additional monthly fees. The information center 102 can secure further operating funds by obtaining the additional monthly fees.

Next, the contents of "Running Support/Customized Control Agreement" will be explained in detail with references of FIGS. 10 through 18.

When the "Running Support/Customized Control Agreement" is concluded, the customer or user of the vehicle can receive, from the information center 102, environment data including the vehicle running speed, the road surface condition, actual running environment images and the like, and the vehicle of the customer can be provided with customized control characteristics based on circumstances and driving conditions.

A customer who does not transmit his own environment data and learned data but wishes to receive environment data and learned data of other customers, needs to pay a monthly fee of $200 (maximum charge). At this time, the customer further needs to pay 20 cents per receipt of data from the information center 102.

A customer who transmits his own environment data (and of course receives data from the information center 102) needs to pay a reduced monthly fee of $100, and pay 2 cents per receipt of data from the information center 102, while he needs to pay no fee when he transmits data. A customer who transmits his own environment data and image data (taken by a web camera) needs to pay a further reduced monthly fee of $5, and pay 2 cents per reception of data from the information center 102, while he needs to pay no fee when he transmits data.

Owing to the establishment of the monthly fee, many customers can be expected to transmit their own environment data and image data, and the information center 102 can collect much more environment data to accumulate more accurate and reliable environment data.

Figure 10:
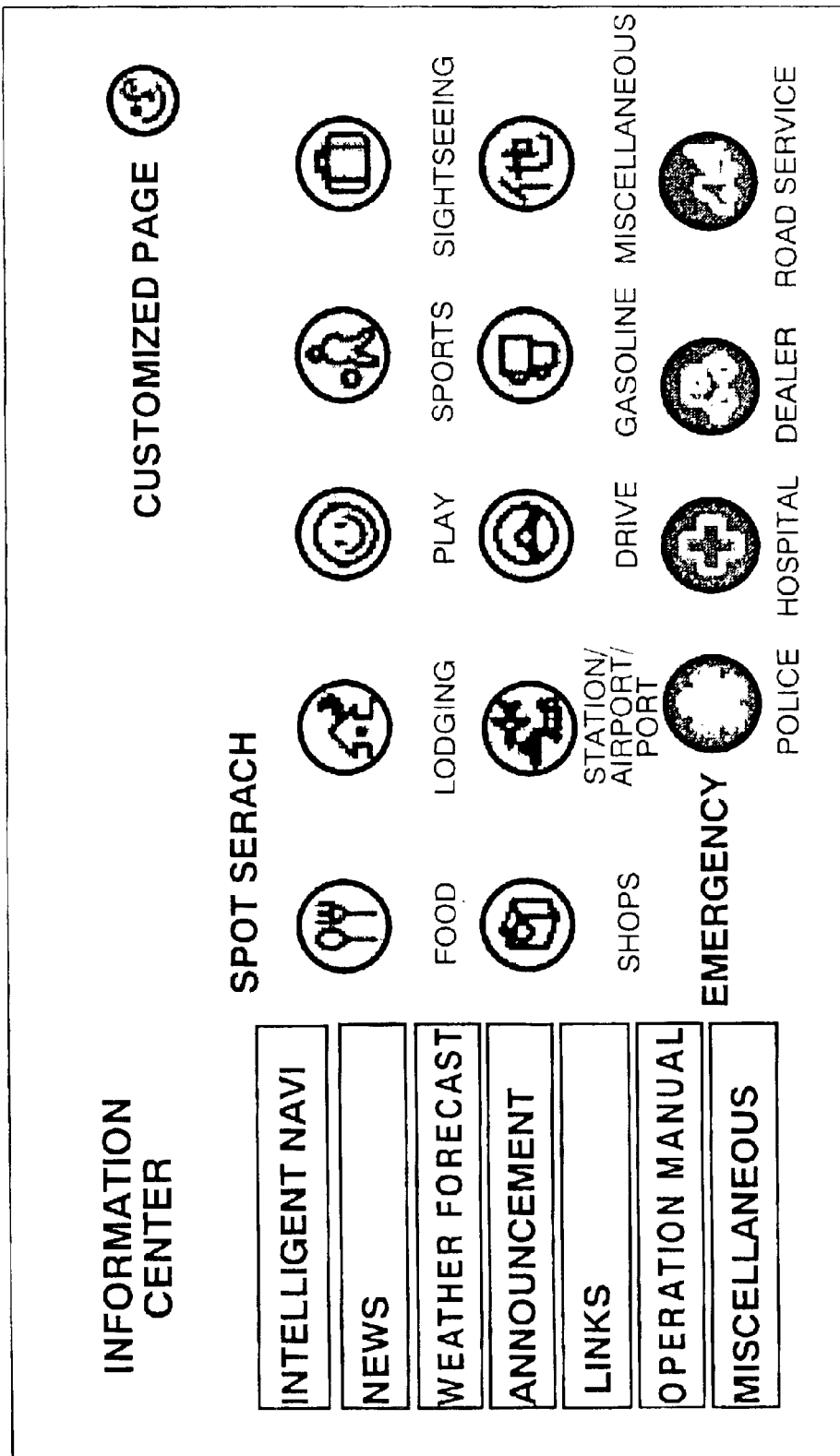
FIG. 10 is a diagram shown on an onboard display of the vehicle.

FIG. 10 shows an example of a screen of the display device 19. The screen in FIG. 10 is displayed when the main control unit 50 is connected through the network 104 with the information center 102. The same screen is also displayed when the home computer 110 or the like is connected with the information center 102.

When "INTELLIGENT NAVI" on the screen of FIG. 10 is selected, the user 106 (the vehicle 1, the home computer 110 or the like) is connected with the information center 102, and implementation of the "Running Support/Customized Control Agreement" is started.

Figure 11:
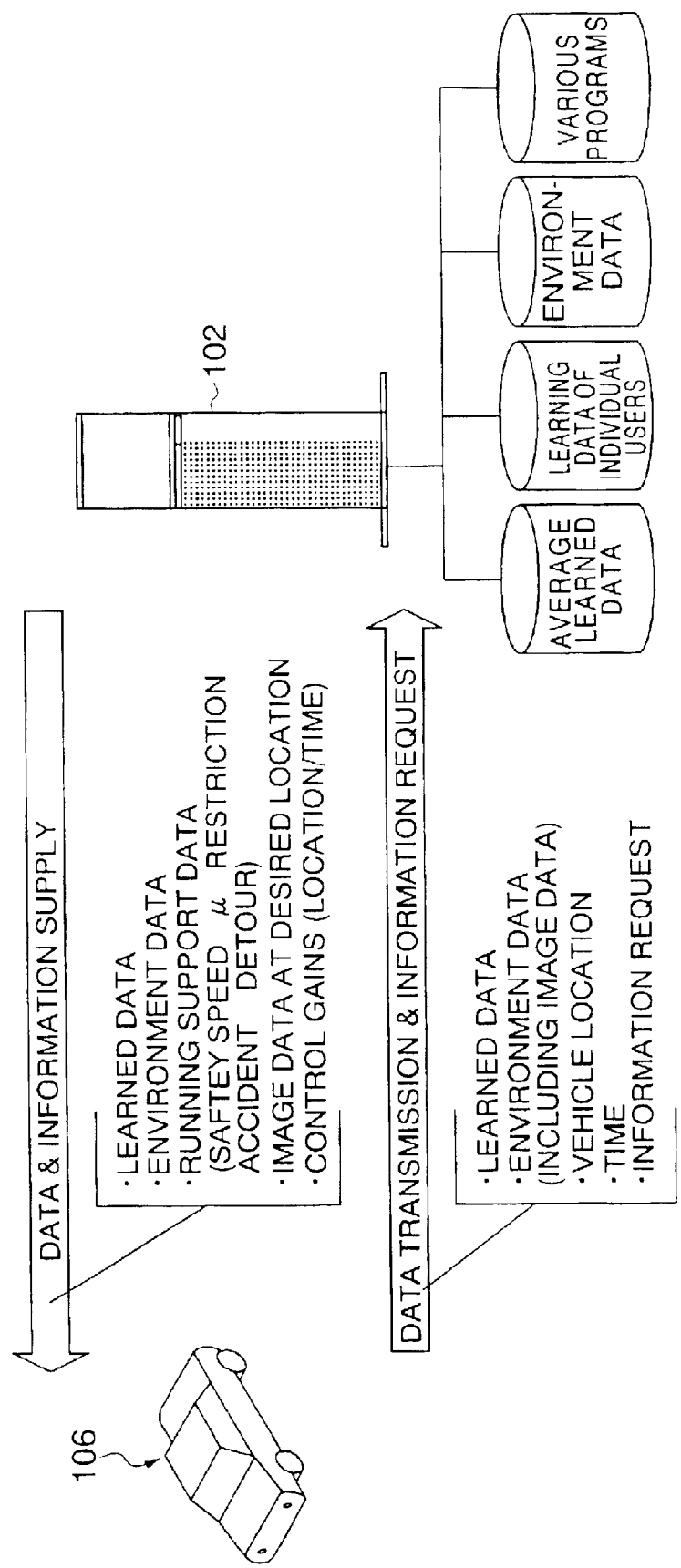
FIG. 11 is a schematic view showing contents of information communicated between an information center and a user when a "Running Support/Customized Control Agreement" is concluded.

FIG. 11 is a schematic view showing particulars of the information communicated between the information center 102 and the user 106 (the vehicle 1, the home computer 110 or the like) when the "Running Support/Customized Control Agreement" is implemented.

The user 106 transmits learned data and environment data (including image data) to the information center 102. The learned data show the driving characteristics of the user that are obtained by learning the actual driving operation of the user. The environment data are obtained when the user 106 drives the vehicle 1 in specific areas. When the learned data and the environment data are transmitted, the vehicle locations and the times where and when these data are obtained are also transmitted to the information center 102.

Further, the user 106 can transmit an information request explained below to the information center 102.

The user 106 transmits these data, requests and the like in real time or at predetermined times. Other transmitting time points may include vehicle stop time, engine start/stop time, and user transmission request time.

On the other hand, the information center 102 transmits, based on the request of the user 106, the learned data, the environment data, the running support data (including safe speed, road surface $\mu$, accident information, detour information and the like), the requested image data, and the control gains (for each location and time).

The particulars of the data stored in the database in the information center 102 will be explained with reference to FIG. 12.

The information center 102 is provided with a first database 130, a second database 132, a third database 134 and a fourth database 136.

The first database 130 stores various programs that are the same as those stored in the ROM 51 and the RAM 52. Namely, the programs are the configuration programs A1 through A7, the standard programs B1 through B5, the learning programs C1 through C3 and D1 through D7, the modification programs E1 through E7 and other programs that perform other services in the contract. The information center 102 thus has the same programs as those in the vehicle 1 and therefore can produce the control gains by using the learned data and the environment data received from the users.

The second database 132 stores the environment data separately based on the areas or locations and the times where and when such data were obtained. The environment data are common data of the users or members, and the users can therefore access or view the environment data. Namely, the environment data includes running environment data, road surface information, computed information, temperature information and image data. The running environment data include speed zone, traffic jam information, traffic restriction information, traffic regulation information, weather information, ice and snow information, and fuel consumption information. The road surface information includes road surface roughness, road curvature, and road grade. The computed information includes average vehicle speed, average braking location, and average control gain.

Since the information center 102 receives the environment data separately for each area and each time of from many users, and accumulates these environment data, the information center 102 can use the environment data to transmit various information to the respective users as explained below.

The third database 134 separately stores the learned data of the respective users. The learned data include vehicle data and user data on the respective users. The user data include learning operation data obtained by learning the user's driving operations in the user's own vehicle. Nobody other than the user can access the user's learned data; namely, unauthorized access to the learned data in the information center 102 by the third parties is prohibited. When the user wishes to inspect his own learned data in the information center 102, the user can access them by using his ID or password. The vehicle data among the learned data include vehicle data on year built, type, drive type, running distance (mileage), and repair and inspection history. The user data include data on sex, age, address, driving preferences, learned operation data (by location and time), and standard operation data.

The fourth database 136 stores average learned data exclusive to the information center 102 that cannot be in principle be viewed by users. The average learned data are used mainly when the information center 102 produces a control gain, are also useful to the car maker 116 in developing new vehicle technologies.

The average learned data are obtained by classifying the learned data of the individual users by specific items (characteristics) and averaging the learned data for each (characteristic). The items (characteristics) include vehicle type, driver sex, age and driving preferences, area, time zone, intended use (commute, recreation) and the like. The reason why the learned data are classified by such items is that the driving characteristics of the users distinctly differ with regard to such items. As a result, when a control gain for a specific user requesting the information is produced by utilizing the learned data of other users, the control gain should be a relatively suitable one for that user.

The information center 102 can provide various kinds of running support to the customers or users by effectively using the accumulated environment data.

Figure 13:
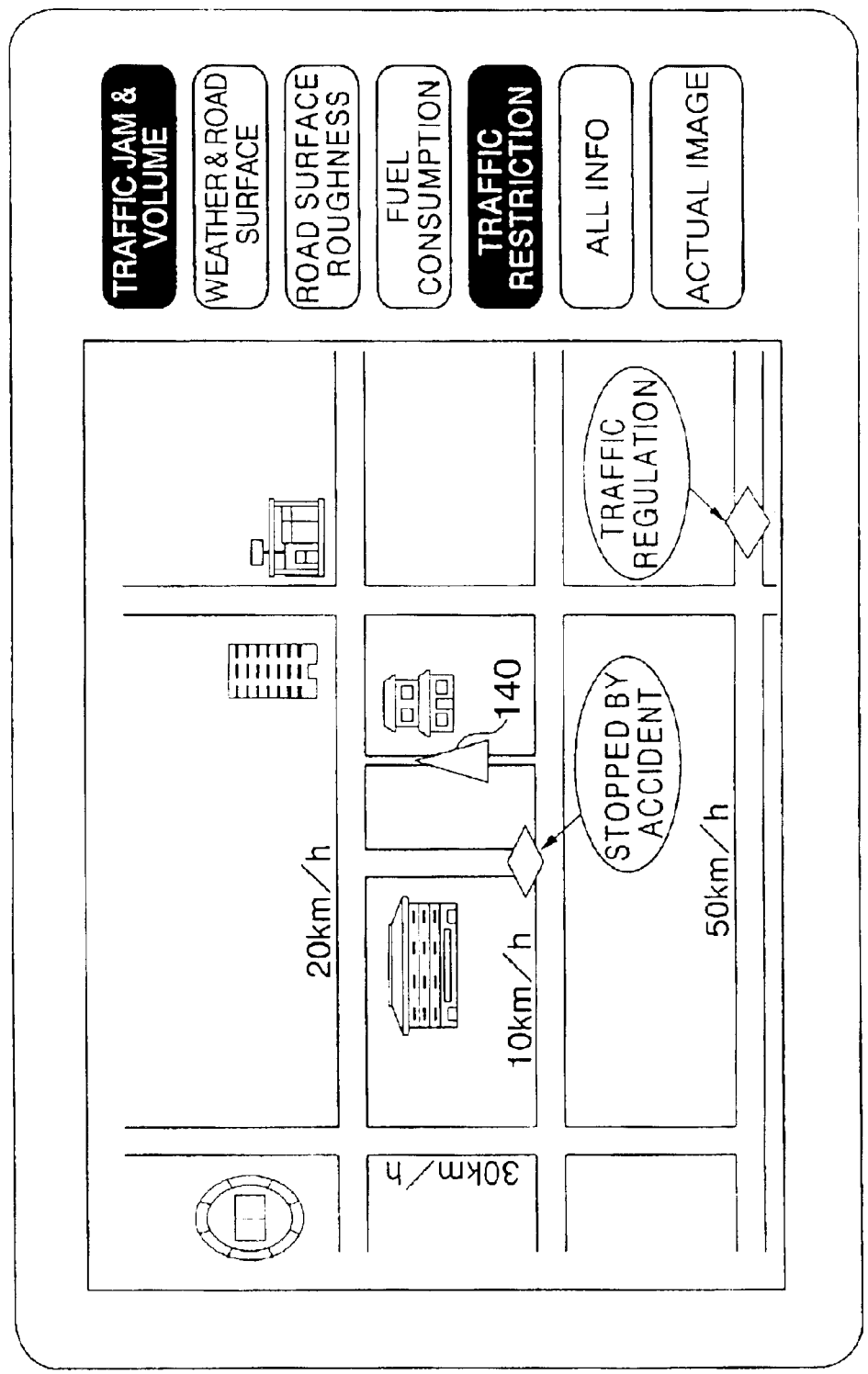
FIG. 13 is a diagram shown on the onboard display of a vehicle when traffic jam and traffic condition information and a traffic restriction information are selected by a user.

Two examples of such running support will be explained. The first example will be explained with reference to FIG. 13. FIG. 13 shows the screen of the display device 19 that displays the environment data (running support data) received from the information center 102 when the user requests such data from the information center 102.

On the screen of the display device 19, Traffic Jam & Volume and Traffic Restriction have been selected by the user. The screen of the device 19 displays the present vehicle location 140, roads in the neighborhood of the present vehicle location, road closed information, and traffic regulation information. The screen further displays average vehicle speeds on the respective roads (for example 10 km/h, 20 km/h, 30 km/h, 40 km/h). The user or driver can accurately grasp the traffic conditions at the vehicle's present location.

Aside from Traffic Jam & Volume and Traffic Restriction, the user may select Weather and Road Surface, Road Roughness, Fuel Consumption, All Information and Actual Image.

The screen displayed on the display device 19 provides the user with the latest environment data (running support data) from the information center 102 and enables the user to utilize the data in real time. The user can obtain accurate and speedy running support.

The second example of the running support will be explained. The information center 102 stores environment data in the second database 132 and user addresses in the third database 134. The information center 102 can determine whether environment data of the user are data of a user who lives in the area where the data were obtained. The information center can ascertain which route the users living in the area frequently use. The information center can therefore define the frequently used route as a detour and provide a user requesting such information who does not live in the area with the detour information.

The conventional vehicle navigation system provides an optimal route based on distance and time. Therefore, the system is not necessarily satisfactory to drivers. According to the embodiment of the present invention explained above, since the information center estimates the route that is frequently used by the users living in the area as a detour, a reliable and satisfactory detour can be indicated to the drivers.

The information center 102 can further ascertain which facilities (restaurants or the like) and destinations users living in the area frequently use/visit. The information center can therefore conclude that frequently used facilities and destinations are recommendable and provide a user requesting such information who does not live in the area with information on good facilities and good places to visit.

The conventional vehicle navigation system provides, for example, only the addresses and locations of restaurants when a user requests such information. The user has no basis for selecting a good restaurant among such restaurants and therefore cannot use the information effectively. According to the embodiment of the present invention explained above, since the information center can provide the requesting user with information regarding facilities and destinations which are frequently used by users living in the area, reliable and useful information can be provided to the drivers.

The detour information and the facility and destination information explained above are generally requested by a user who does not live in the area where such information is obtained. However, a user living in the area may also request such information if he has recently moved to the area.

Further, the information center 102 obtains an average vehicle speed on specific roads, especially on specific curved roads, and supplies the average speed to a user who requests information regarding the average vehicle speed on a specific road. As user can therefore drive his vehicle while keeping the average vehicle speed on the specific curved road in mind, driving safety is improved.

The information center corrects the information regarding the average vehicle speed so as to match the characteristics of the requesting user's vehicle. Namely, the information may be corrected based on the difference in the number of passengers in the user's vehicle and the vehicle providing such information and/or based on difference in the vehicle type between the user's vehicle and the vehicle providing such information.

Moreover, the information center 102 can provide a requesting user with environment data regarding an area located ahead on the preset route of the vehicle of the requesting user. The environment data are stored in the second database 132 and include vehicle speed information, traffic jam information, traffic restriction information, weather-ice-snow information (including road surface $\mu$) ant the like.

How this embodiment of the present invention produces vehicle control gains will be explained with reference to FIGS. 14 through 17.

Figure 14:
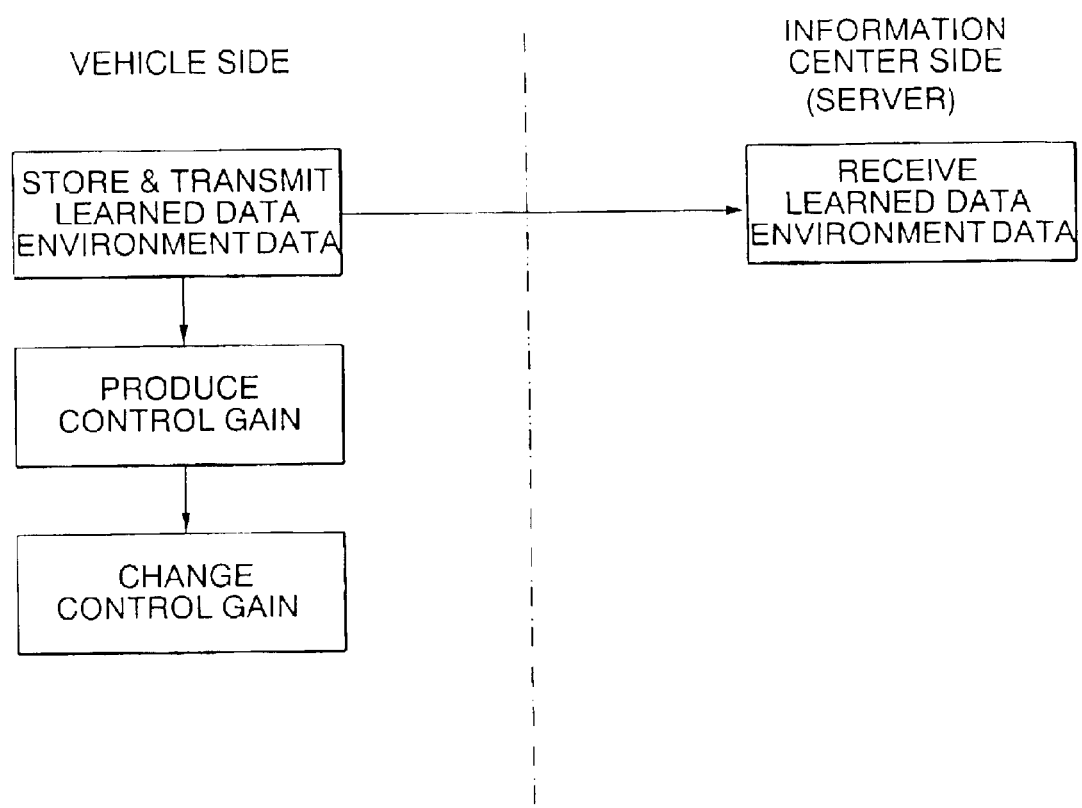
FIG. 14 is a flowchart of procedures in a first mode for providing a vehicle with control gains according to an embodiment of the present invention.
Figure 15:
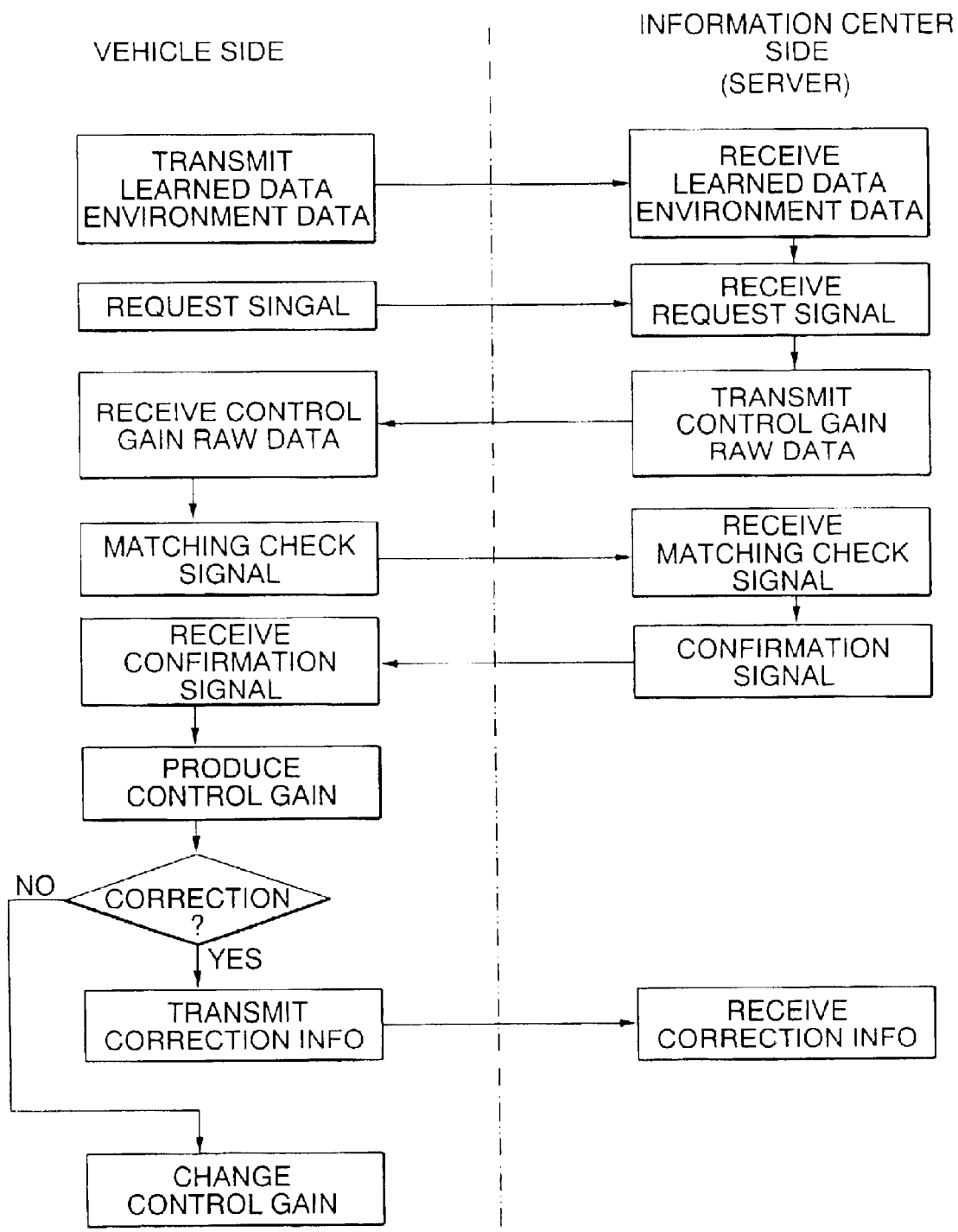
FIG. 15 is a flowchart of procedures in a second mode for providing a vehicle with control gains according to an embodiment of the present invention.
Figure 16:
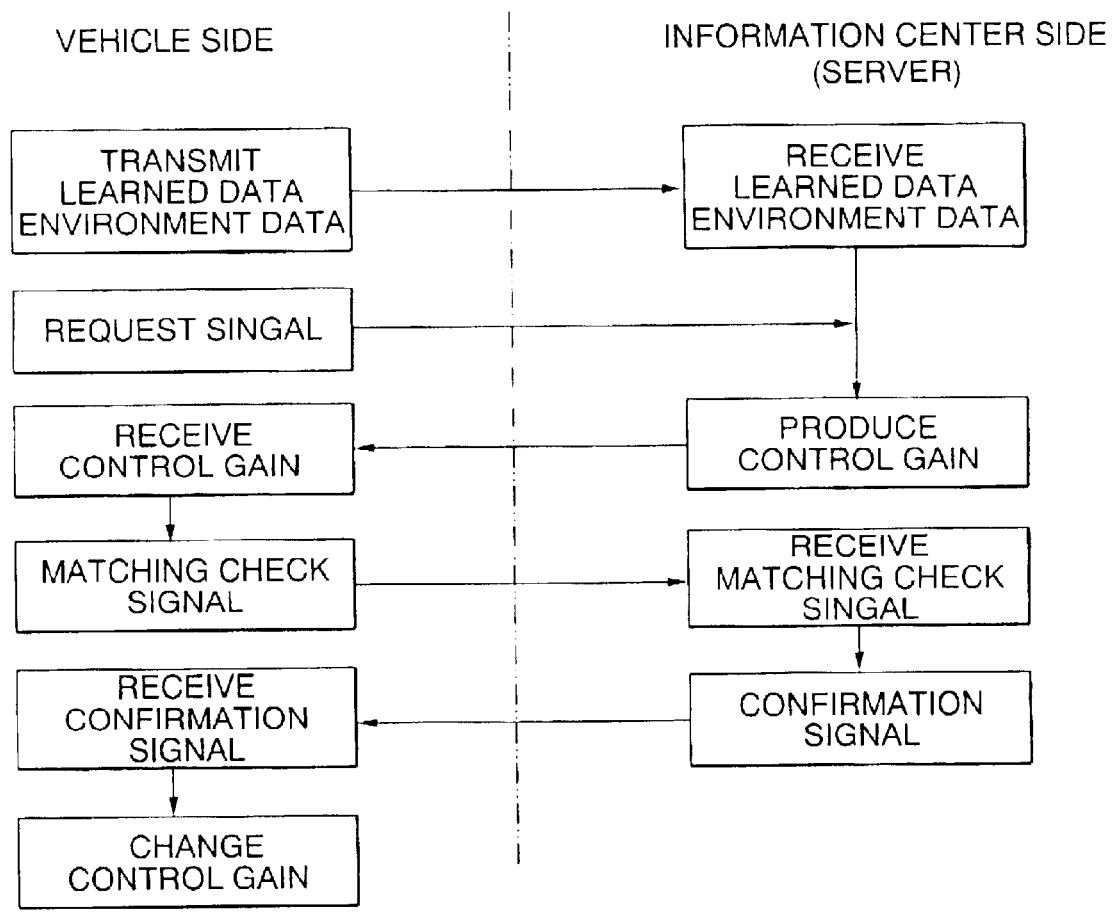
FIG. 16 is a flowchart of procedures in a third mode for providing a vehicle with control gains according to an embodiment of the present invention.

This embodiment of the present invention includes the following three modes of producing vehicle control grains. FIG. 14 shows a first mode wherein the vehicle produces control gains using its own learned data and environment data. FIG. 15 shows a second mode wherein the vehicle receives necessary information extracted from the learned data and the environment data of other users accumulated in the information center and produces the control gains at its end using such data of other users. FIG. 16 shows a third mode wherein the information center produces the control gains using the accumulated environment data and environment data and transmits the produced control gains to the vehicle whose user has requested the control gains from the information center.

Referring to FIG. 14, in the first mode, the vehicle first obtains learned data and environment data at its end, stores the data in the RAM 52 and also transmits the data to the information center (server) 102. The information center can use such data for other users. The vehicle produces control gains based on the learned data and the environment data stored in its own RAM 52 and changes the present control gains to the newly produced control gains.

The first mode is preferable in a specific area (a frequently visited area) that is located within a predetermined distance such as 20 km from the user's home, the user's car dealer, the location of a rental car agent, the home base of a commercial vehicle or the like. Since the user frequently drives his vehicle in the area, the user can obtain enough learned data and environment data by himself. Further, the user can obtain running characteristics of the vehicle that very closely match his preferred characteristics.

As shown in FIG. 15, in the second mode, the vehicle first obtains learned data and environment data at its end, and transmits the data to the information center (server) 102. At this time, the vehicle may store the learned data and the environment data or only the learned data (the vehicle does not store the environment data) in its own RAM 52. The information center stores the learned data and the environment data.

When the information center receives a request signal (a request for information) from the vehicle side, the information center selects data necessary for producing control gains from among the accumulated learned data and environment data. Then, the vehicle side receives the selected data (raw data for producing control gains) from the information center.

The vehicle side transmits the raw data for producing control gains back to the information center as a matching check signal to confirm whether they are the correct data. The information center then checks whether they are the correct data, and, if they are, the information center transmits a confirmation signal to the vehicle side and the vehicle side receives the confirmation signal. Thus, the matching check of the data for producing control gains is completed.

Then, the vehicle side produces control gains using the received and confirmed data. Since the received data for producing control gains are obtained from other users, the vehicle side can, if necessary, correct the received raw data for producing control gains before producing the control gains. Otherwise, the vehicle side can produce the control gains based on the received data and then correct the control gains. When the vehicle side corrects the data for producing control gains or the control gains, the vehicle side can transmit this corrected information to the information center, and the information center can accumulate the corrected information.

In the second mode, since the vehicle side produces the control gains, the workload of the information center is be reduced. The average learned data on the above explained items of a plurality of other users are preferably used as the data for producing control gains in the second mode. In this case, since the user producing the control gains and the other users supplying the learned data are same or similar in vehicle type and driver driving preference, sex, age and the like, the user can obtain relatively suitable data, and obtain control gains that nearly match his optimum ones.

Instead of using the average learned data as the data for producing control gains, the requesting user may employ individual data (individual user learned data stored in the third database 134) of another user who has similar characteristics to the requesting user. Such individual data may be corrected, if necessary.

Referring to FIG. 16, in the third mode, the information center produces the control gains by using the accumulated learned data and environment data and transmits the produced control gains to the vehicle side. The method of matching the two kinds of the control gains is as same as that in the second example. Since, in the third mode, the control gains are not produced on the vehicle side, the workload on the vehicle side is be reduced.

In the third mode, as in the second mode, the average learned data on the above explained items of a plurality of other users are preferably used as the data for producing control gains. In this case, since the user producing the control gains and the other users supplying the learned data are the same or similar in vehicle type, driving preference, sex, age and the like, the user can obtain relatively suitable data, and obtain control gains that nearly match his optimum ones. Further, as in the second mode, instead of using the average learned data as the data for producing control gains, the requesting user may employ individual data (individual user learned data stored in the third database 134) of another user who has similar characteristics to the requesting user. Such individual data may be corrected, if necessary.

According to this embodiment of the present invention, when the vehicle side receives various information from the information center (server), the vehicle side can receive it through the network 104 by the onboard transmitting and receiving device 126. At this time, the vehicle side may receives the information through the home computer 110, stores it in a storage medium such as a FD, MD or DVD and store it in the RAM 52 of the vehicle. Further, the vehicle side may receive the information through the home computer 110 and transmit it through the network 104 to the vehicle so that it is stored in the RAM 52.

Next, this embodiment of the present invention will be explained with regard to the cases where the user drives a rental car, drives another user's vehicle, and purchases a new or used vehicle and replaces the old vehicle with the new or used vehicle. In these three cases, the information center 102 provides the vehicle concerned with necessary information for modifying the control characteristics of the vehicle.

Figure 17:
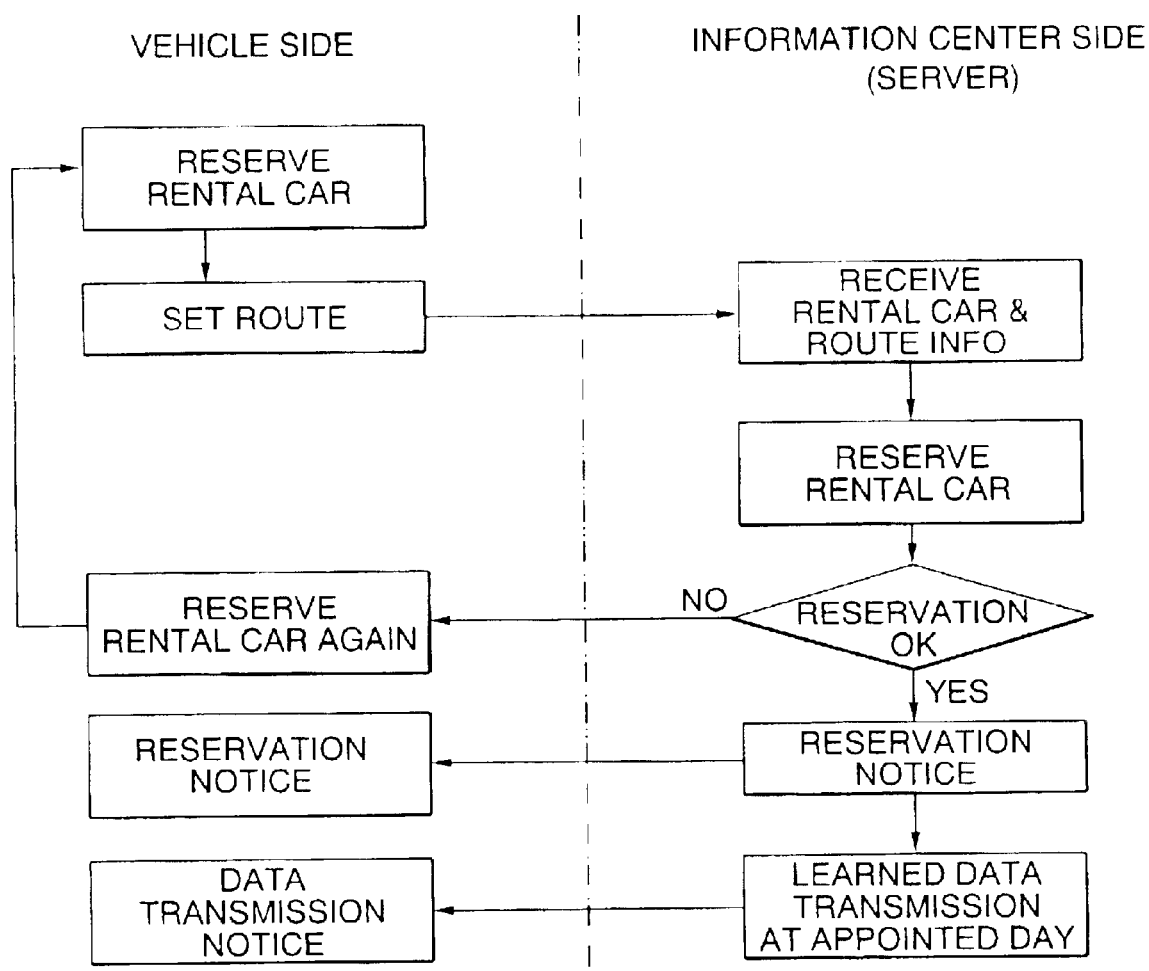
FIG. 17 is a flowchart showing communication of various information between a vehicle and an information center when the vehicle is a rental car.

The case where the user drives a rental car will be explained first with reference to FIG. 17. The information center 102 is equipped with a rental car reservation system and can communicate with the vehicle side, namely with the home computer 110. Referring to FIG. 17, on the vehicle side, the user reserves a rental car on the home computer 110 or the like and maps the route to be traveled when the user drives the rental car. The reservation of the rental car and the setting of the route are transmitted to the information center (server) 102, while the information center 102 receives the information regarding the rental car reservation and the route setting and reserves the rental car through the network 104 with a rental car agent 120. If the information center cannot reserve a rental car, the information center 102 so informs the vehicle side, while the vehicle side tries to again reserve a rental car.

When the reservation of the rental car has been made, the information center 102 transmits a notice of the reservation to the vehicle side and the vehicle side receives the reservation notice. Thereafter, the information center transmits learned data explained below to the vehicle side on the appointed day. The learned data may be transmitted to the vehicle, the home computer 110 or the like. If the learned data is transmitted to the home computer, the learned data received by the computer 110 is stored in the rental car through a storage medium or the network.

Next, the learned data transmitted from the information center to the vehicle side will be explained. The learned data may take the following various forms.

When the learned data of the user are stored in the third database 134 of the information center 102, the learned data of the user may be transmitted to the vehicle side. The learned data per se may be transmitted or control gains produced from the learned data may be transmitted. Here, the learned data is used to mean both the learned data per se and the control gains produced from the learned data.

When the learned data of the user are not stored in the third database 134, the learned data of another user stored in the database 134 may be transmitted to the vehicle side. The driving characteristics of other users need to be as similar as possible to those of the user driving the rental car. As explained above, the learned data per se may be transmitted or control gains produced from the learned data may be transmitted. Here, "learned data" is used to mean both the learned data per se and the control gains produced from the learned data.

When the learned data of the user are not stored in the third database 134, the average learned data of other users stored in the database 136 may be transmitted to the vehicle side. The average learned data per se may be transmitted or control gains produced from the average learned data may be transmitted. Here, "average learned data" is used to mean both the average learned data per se and the control gains produced from the average learned data.

Further, in the above mentioned three modes, the learned data (including the control gains) or the average learned data (including the control gains), which are transmitted from the information center to the vehicle side, are preferably obtained by correcting the stored data by a predetermined value on the safe side. By this, adverse effects caused by slight difference in the characteristics between the vehicle of the user and the rental car can be prevented.

Further, when the vehicle type of the rental car is different from that of the user's vehicle, the learned data (including the control gains) or the average learned data (including the control gains), which are transmitted to the vehicle side, are preferably corrected based on the difference between the types of the rental car and the user's vehicle. Since such difference between the types of the rental car and the user's vehicle is known in advance, the data to be transmitted can be easily corrected. As a result, even if the user uses a rental car, the user can drive a rental car which has characteristics matching those of the user's own vehicle.

When the user drives the rental car, the user never transmits learned data to the information center and the information center never receives learned data from the rental car. The learned data obtained by the rental car are not useful to the user's vehicle However, when the user drives the rental car, environment data obtained by the rental car may be transmitted to the information center.

When a user borrows a vehicle from another user and he drives the vehicle, as in the case of the rental car, the user receives the learned data (including the control gains) or the average learned data (including the control gains) from the information center, and the user changes the control gains by using these data. In this case, such learned data or the like are preferably corrected by a predetermined value on the safe side. Further, such learned data or the like are preferably corrected based on the difference between the types of the borrowed vehicle and the user's own vehicle.

When the user purchase a new or used vehicle and replaces his old vehicle with the new or used vehicle, the information center transmits the learned data on the user to the car maker or the car dealer concerned, and the car maker or the car dealer stores the learned data on the user in the purchased vehicle. Here, the learned data may be control gains produced from the learned data. "Learned data" is used here to mean both the learned data per se and the control gains produced from the learned data.

In the case where the user purchases a new or used vehicle and replaces his old vehicle with the new or used vehicle, the learned data to be sent to the car maker or the car dealer are preferably corrected by a predetermined value toward the safe side. Further, when the types of the presently owned vehicle and the purchased vehicle are different, the learned data (including the control gains) are preferably corrected based on the difference in the types of the two vehicles.

Further, the learned data corrected on the safe side and the learned data corrected for the difference in the vehicle types are stored in the third database 134 in the information center.

Figure 18:
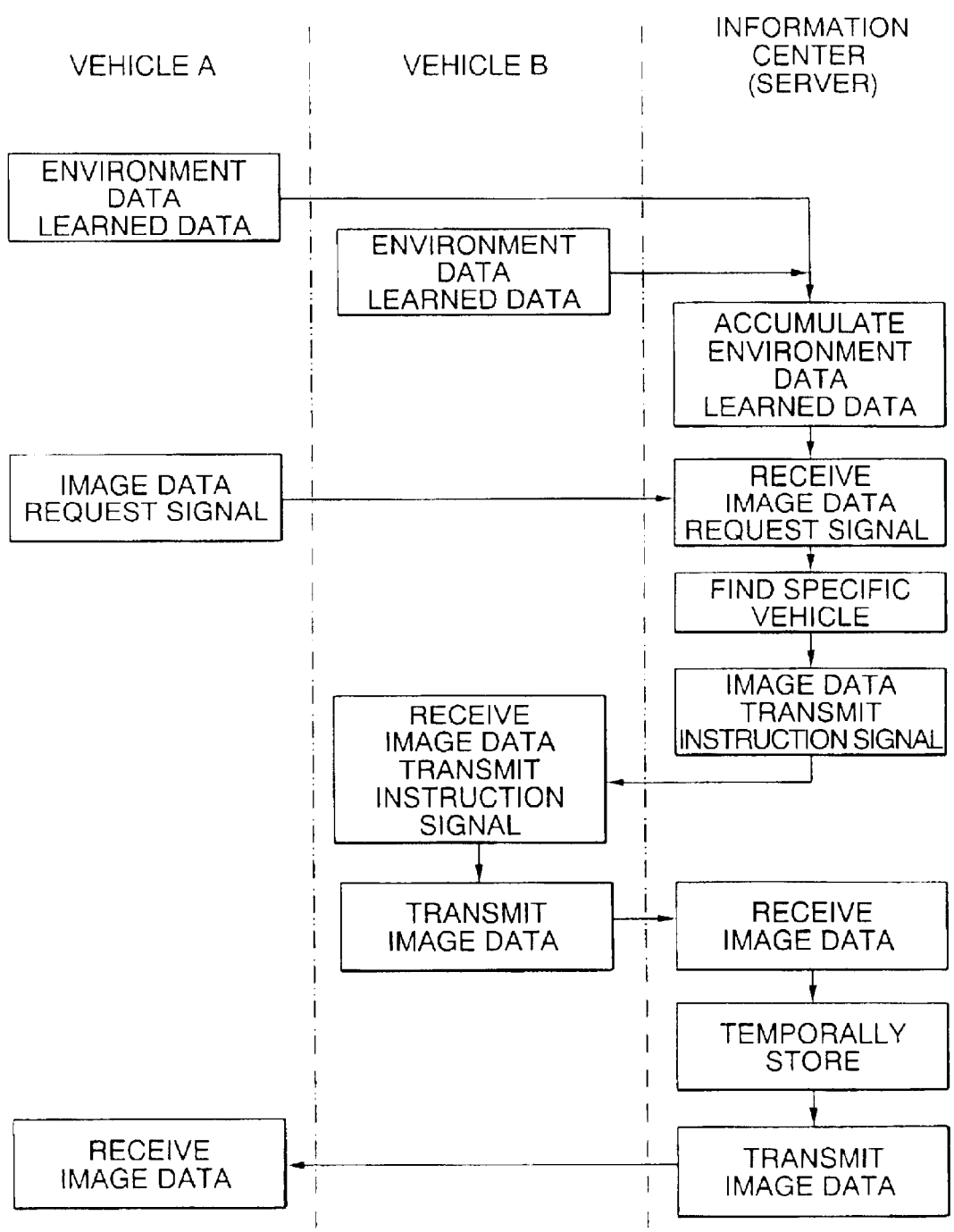
FIG. 18 is a flowchart showing information communicated between a vehicle A of a user requesting image data and an information center or a server and between a vehicle B of a user providing image data and the information center or the server.

Next, use of the web camera 134 according to this embodiment of the present invention will be explained with reference to FIG. 18.

In the embodiment, when the web camera 134 mounted on the vehicle of one user takes images, the other users may obtain the image data and view the images. Referring to FIG. 18, suppose that a vehicle A is the vehicle of the user requesting image data and a vehicle B is the vehicle of the user providing the image data. These vehicles A and B are in communication with the information center (server). At first, as explained above, many users including the users of the vehicles A and B transmit learned data and environment data to the information center, and the information center receives and accumulates the learned data and environment data.

Next, when the user of the vehicle A wishes to receive the image data for a specific location, the vehicle A side transmits an image data request signal for requesting an image at the specific location to the information center. The user of the vehicle A may transmit the signal from the vehicle A, the home computer or the like.

The information center searches the accumulated data to find a vehicle (vehicle B) located at the specific location so as to respond to the image data request signal with a corresponding image. Thereafter, the information center transmits to the vehicle B an image data transmit instruction signal for requesting the vehicle B to transmit image data taken by the web camera of the vehicle B to the information center.

The vehicle B receives the image data transmit instruction signal and transmits the image data for the specific location stored in the storage device (HDD) to the information center. The information center receives the image data of the specific location and temporarily stores the image data together with the time information regarding the image data. The information center transmits the temporarily stored image data for the specific location to the vehicle A (including the home computer of the user of the vehicle A), while the vehicle A (including the home computer) receives the image data of the specific location.

Thus, the user can easily obtain the image data for the specific location, and can accurately grasp the situation at the specific location or place. Namely, the user can easily specify the place and check, for example, whether traffic is congested in front of a station, a parking lot is full, the weather is snowy or the like at the specified place.

The vehicle B and the user of the vehicle B cannot be identified by the requesting user (vehicle A) and other users. As a result, many more users can be expected to provide image data. The image data taken by the web camera may be either a still image data or moving image data.

When the user wishes to continuously see images at the specific location for a relatively long time, the information center may instruct a plurality of vehicles, located near the specific location, to sequentially transmit images of the specific location taken by the web cameras of the vehicles.

The contract fee (see FIG. 9) of a user whose vehicle is equipped with a web camera and transmits image data to the information center may be reduced.

The information center can transmit the image data transmit instruction signal to the specific vehicle for a predetermined short time period such as 10 minutes so that the specific vehicle cannot be tracked for more than the predetermined time period. This is expected to encourage many more users to provide image data.

On the contrary, the information center can transmit the image data transmit instruction signal to the specific vehicle for a predetermined long time period such as 1 hour so that the specific vehicle can be tracked for the predetermined long time period. This is useful, for instance, when the vehicle has been stolen.

In this embodiment of the present invention, since the user vehicles are equipped with web cameras, the information center can serve as an accident-evidence server by using the web cameras as explained below.

In order for the information center to serve as an accident-evidence server, the information center stores the learned data and the environment data of the respective users, and the vehicles of the users are provided with web cameras and storage devices (HDDs) for storing data of images taken by the web cameras.

The vehicle of a user transmits an accident occurrence signal to the information center. The information center receives the accident occurrence signal and then transmits an instruction signal to the vehicle requesting it to transmit to the information center image data for before and after accident occurrence. The information center fetches the corresponding learned data and the environment data for the time before and after accident occurrence. Then, the information center stores these data, namely the image data before and after the accident occurrence, and the corresponding learned data and the environment data for the time before and after accident occurrence, all together in an accident evidence storage device.

The information center produces accident evidence by analyzing these data stored in the storage device to determine the cause of the accident.

When the information center has produced accident evidence, the user involved in the accident may examine the image data, learned data and environment data stored in the accident evidence storage device. On the contrary, other users may not examine these data, but the police may inspect the data if necessary.

Further, when the information center receives an accident occurrence signal, if the vehicles of other users are located near the accident site, the information center may transmit an image data transmit signal to the vehicles of the other users and then receive accident image data.

Moreover, according to this embodiment of the present invention, the information center (server) can also serve as a server for collecting vehicle development data. Referring back to FIG. 12, the third database 134 separately stores the learned data of the respective users. The learned data includes vehicle data and user data of the respective users. The user data contains learned operation data obtained by learning the user's driving operations in his own vehicle. The vehicle data of the learned data contains the year the vehicle was built, the vehicle type, the vehicle drive type, the running distance (mileage), and the repair and inspection history. The user data includes the drivers sex, age, address, driving preferences, learned operation data (by location and time), and standard operation data. The car maker may inspect the learned data of the respective users to develop new vehicle technology.

Further, the fourth database in FIG. 12 stores average learned data. The average learned data are obtained by classifying the respective learned data of the respective users into the specific items (characteristics) and averaging the respective learned data on the specific items (characteristics). The items (characteristics) include vehicle type, driver sex, age and driving preferences, area, time zone, intended use (commute, recreation) and the like. The reason why the respective learned data are classified by such items is that the driving characteristics of the users distinctly differ with regard to such items. The car maker may also inspect the average learned data classified by characteristics to develop new vehicle technology.

When a user purchases a vehicle, the information center may produce control gains based on the characteristics of the user by using the learned data and the environment data, and provide the purchased vehicle with the control gains.

The information center may select data which relate to the control devices of a newly developed vehicle from the stored learned data and environment data, and provide a target value of the development based on the selected data.

The information center may select from the stored learned data and environment data, data relating to the control devices of a vehicle under development and provide a target value for evaluating the control devices of the vehicle based on the selected data.

Figure 19:
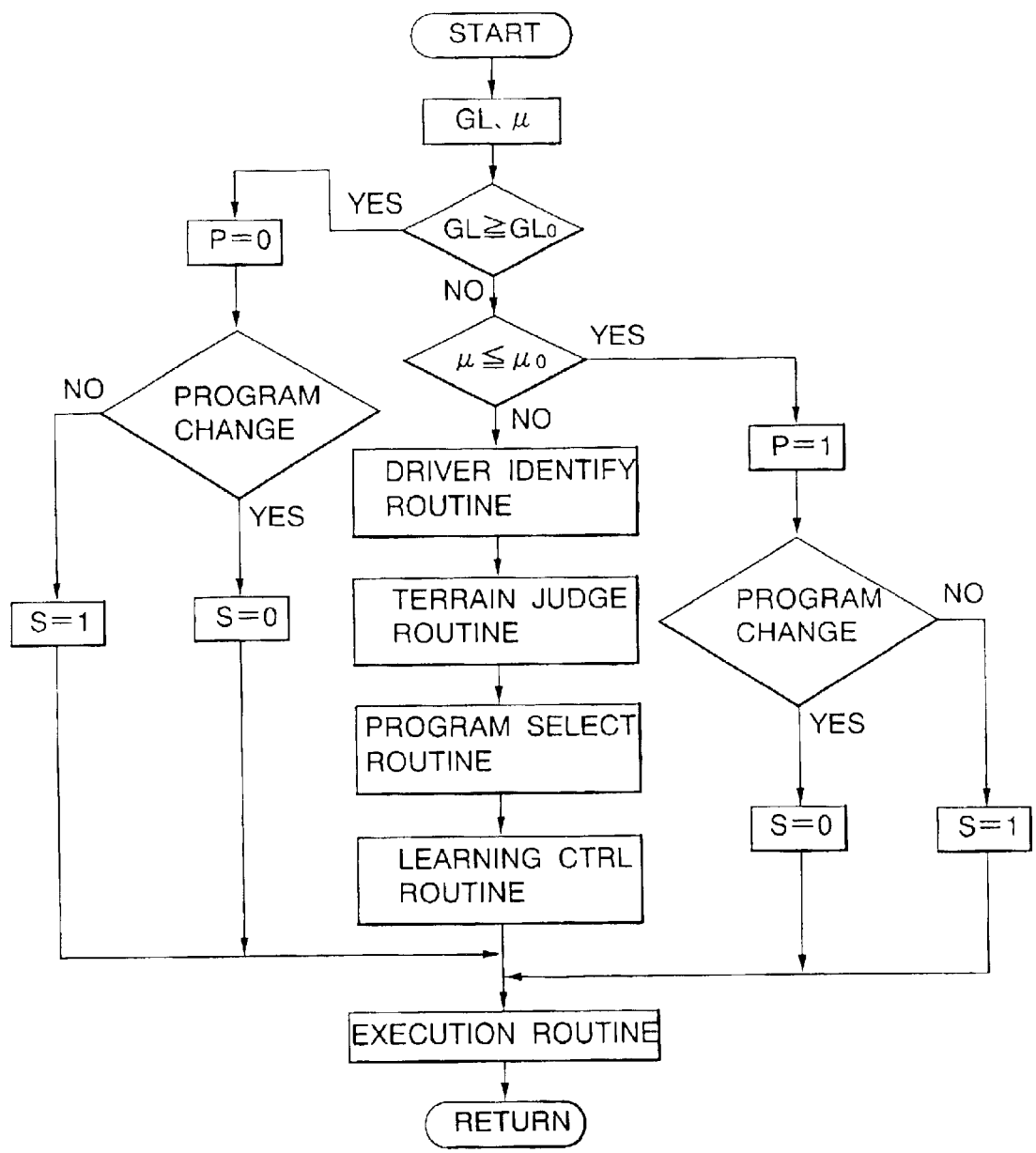
FIG. 19 is a flowchart of a basic routine of the learning control for the control gains for controlling the running characteristics of the vehicle.

FIG. 19 shows a flowchart of a basic routine in the main computer 50. The main computer 50 receives the lateral acceleration GL from the lateral acceleration sensor 46, a presumed value of friction coefficient $\mu$ of the road surface.

The main computer 50 judges whether or not the absolute value of the lateral acceleration GL is greater than a predetermined value, such as 0.5G. If the result is Yes or if the lateral acceleration GL is greater than a predetermined value, it is considered that the control should be carried out in accordance with the program A7 in the ROM 51 so as to improve the running stability. In this case, the computer 50 sets flag P to a value of 0 and judges whether or not a program to be used was changed in the preceding cycle. The flag P is provided for indicating whether or not the vehicle 1 is running on a low friction road. If the result is Yes or if the program to be used has been changed, the computer 50 sets flag S to a value of 0. If not, the computer 50 sets flag S to a value of 1. The flag S is provided for indicating whether or not the program to be used has been changed between the preceding cycle and the current cycle.

If the lateral acceleration is not greater than the predetermined value, the computer 50 judges whether or not the frictional coefficient $\mu$ is not greater than a predetermined value $\mu_0$. If the result is Yes or if the frictional coefficient $\mu$ is not greater than the predetermined value, it is considered that the vehicle 1 is running on a low friction road and that the control should be made taking account of the running stability in accordance with the program A6. In this case, the computer 50 sets the flag P to a value of 1. Then, the computer 50 judges whether or not the program to be used was changed in the preceding cycle. If the result is Yes or if the program to be used has been changed, the computer 50 sets the flag S to a value of 0. If not, the flag S is set to a value of 1.

If the frictional coefficient $\mu$ is greater than the predetermined value, the computer 50 executes a driver identifying subroutine to judge whether or not the driver is the specific driver, such as the owner driver or a member of his family and thus whether or not the control under the programs A1 through A5 is made.

Figure 20:
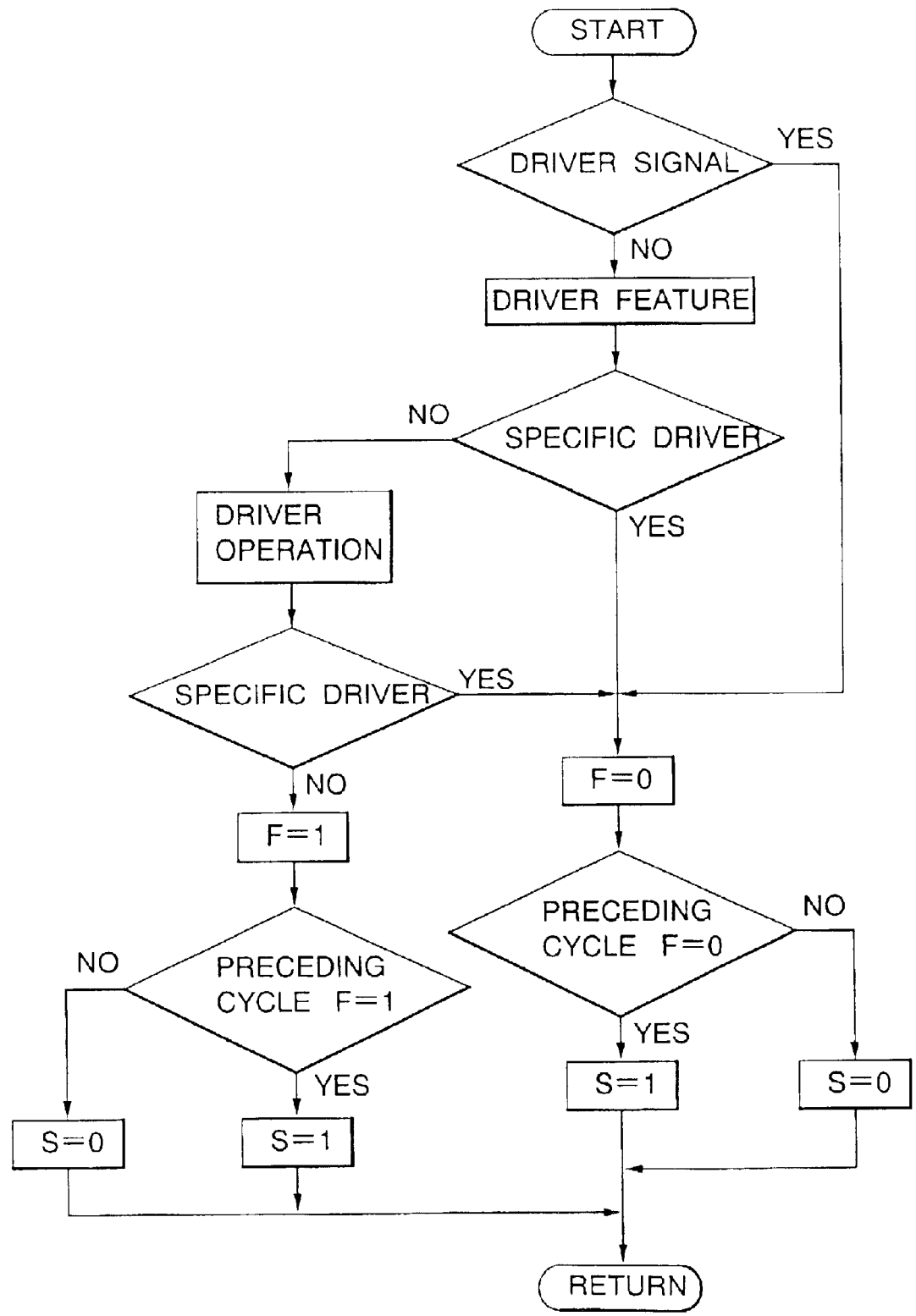
FIG. 20 is a flowchart of a driver identification subroutine.

Namely, as shown in FIG. 20, the computer 50 identifies the specific driver based on a signal from the driver-identifying device 48. The driver-identifying device 48 produces a driver signal indicating the specific driver when an article belonging to the driver such as an IC card, his key, his license, or a clock with a transmitter is detected. This driver signal indicating the specific driver is sent to the computer 50. When the driver signal is received, the main computer 50 sets flag F to a value of 0. The flag F is provided for indicating whether or not the vehicle is driven by the specific driver. Then, the computer 50 judges whether or not the value of the flag F was 0 in the preceding cycle. If this result is No, i.e., if the flag F was not zero in the preceding cycle, the computer 50 sets the flag S to zero. If the flag F was zero in the preceding cycle, the flag S is set to a value of 1.

On the other hand, if the driver signal is not produced, the computer 50 identifies the specific driver based on the driver's physique, weight, voice, seat position and/or looks by means of a weight detecting device, an image processing device, a voice recorder and/or a sheet position detector. In this case, the computer judges the person to be the specific driver when one or more factors are identical with the data stored in the RAM 52. If the computer 50 identifies the specific driver, the computer 50 sets the flag F to a value of 0. Next, the computer 50 checks whether or not the flag F was zero in the preceding cycle. If the flag F was not zero in the preceding cycle, the computer 50 sets the flag S to a value of 0. If the flag F was zero in the preceding cycle as in the present cycle, the flag S is set to a value of 1.

On the other hand, if the computer 50 does not recognize the specific driver, the computer 50 monitors the operation speed of the steering wheel 4, the acceleration pedal 30, the brake pedal 31 and the clutch pedal 32 for a predetermined time period. The computer 50 compares the values of the operation speeds monitored for the predetermined period with the corresponding values stored in the RAM 52 as the values of the specific driver. If the difference between the monitored values and the stored values is within a predetermined scope, the computer determines that the driver is the specific driver.

If the difference is greater than the predetermined value, the computer 50 judges that the driver is not the specific driver. In this case, the computer 50 sets the flag F to a value of 1. Then, the computer 50 judges whether or not the value of the flag F was 1 in the preceding cycle. If the value of the flag F was not 1 in the preceding cycle, the computer 50 sets the flag S to a value of 0. If the flag F was 1 in the preceding cycle as in the present cycle, the computer 50 sets the flag S to a value of 1.

Figure 21:
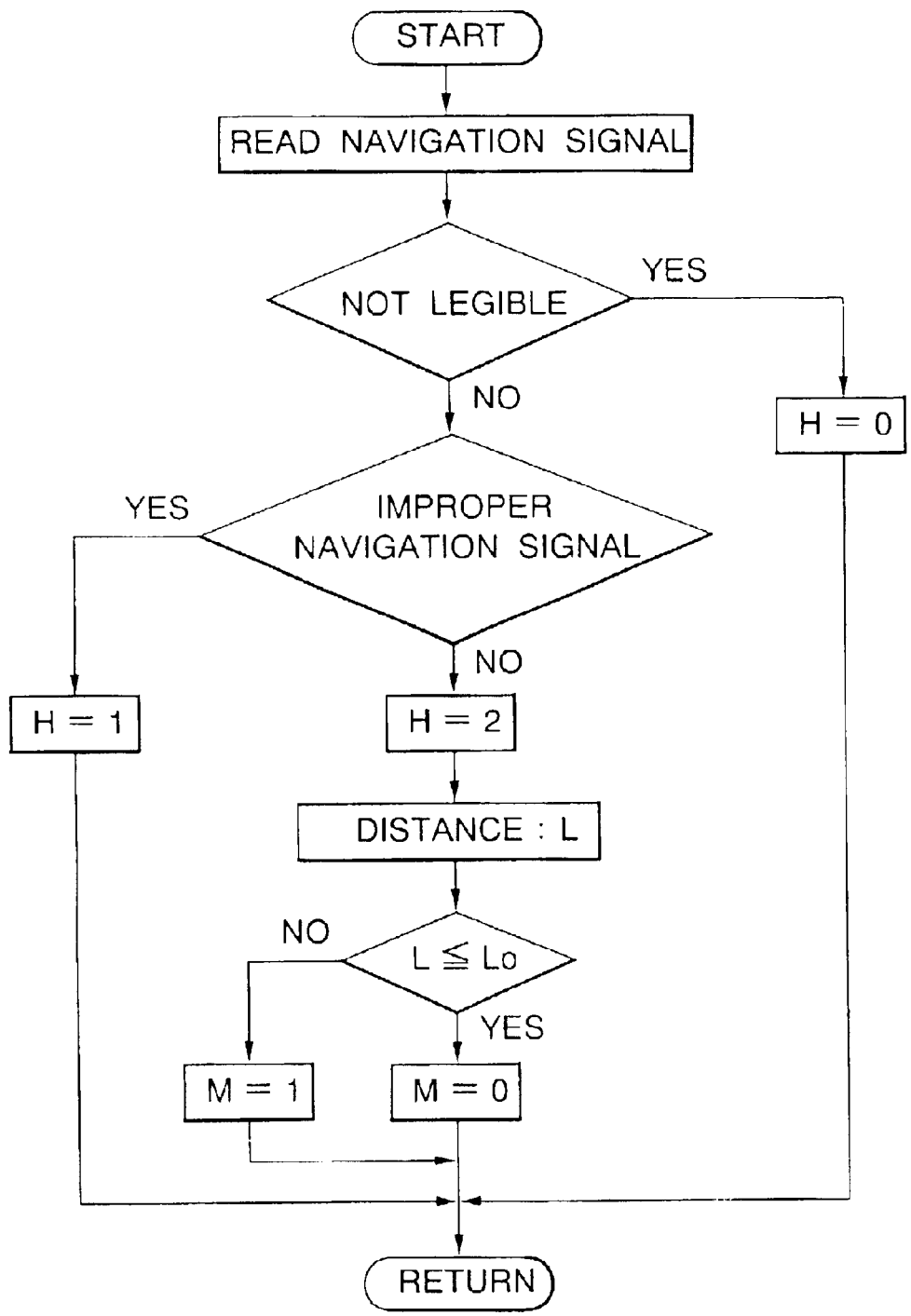
FIG. 21 a flowchart of an area identification subroutine.

Thus, the computer 50 judges whether or not the driver is the specific driver. Then, the computer 50 executes an area identifying subroutine as shown in FIG. 21.

The computer 50 reads a navigation signal produced by the location detecting computer 53 based on the location detecting sensor 18. If the computer 50 cannot read the navigation signal, flag H is set to a value of 0 and the process flow is returned to the beginning. The flag H is provided for indicating whether or not the navigation signal can be properly utilized for the running characteristic control.

If the navigation signal (vehicle location signal) is not proper even when the computer 50 can read the navigation signal (vehicle location signal), so that the location of the vehicle cannot be identified properly, the flag H is set to a value of 1 and the process flow is returned to the beginning.

If the location of the vehicle can be detected based on the navigation signal (vehicle location signal), the flag H is set to a value of 2. In this case, the computer 50 judges whether or not the vehicle 1 is running within a specific area in which the distance L from the owner's house or dealer's office is smaller than a predetermined value L0 such as 20 km. If the vehicle 1 is judged to be in the specific area, the computer 50 sets flag M to a value of 0. If not, the flag M is set to a value of 1. The flag M is provided for indicating whether or not the vehicle 1 is running within the specific area.

Figure 22:
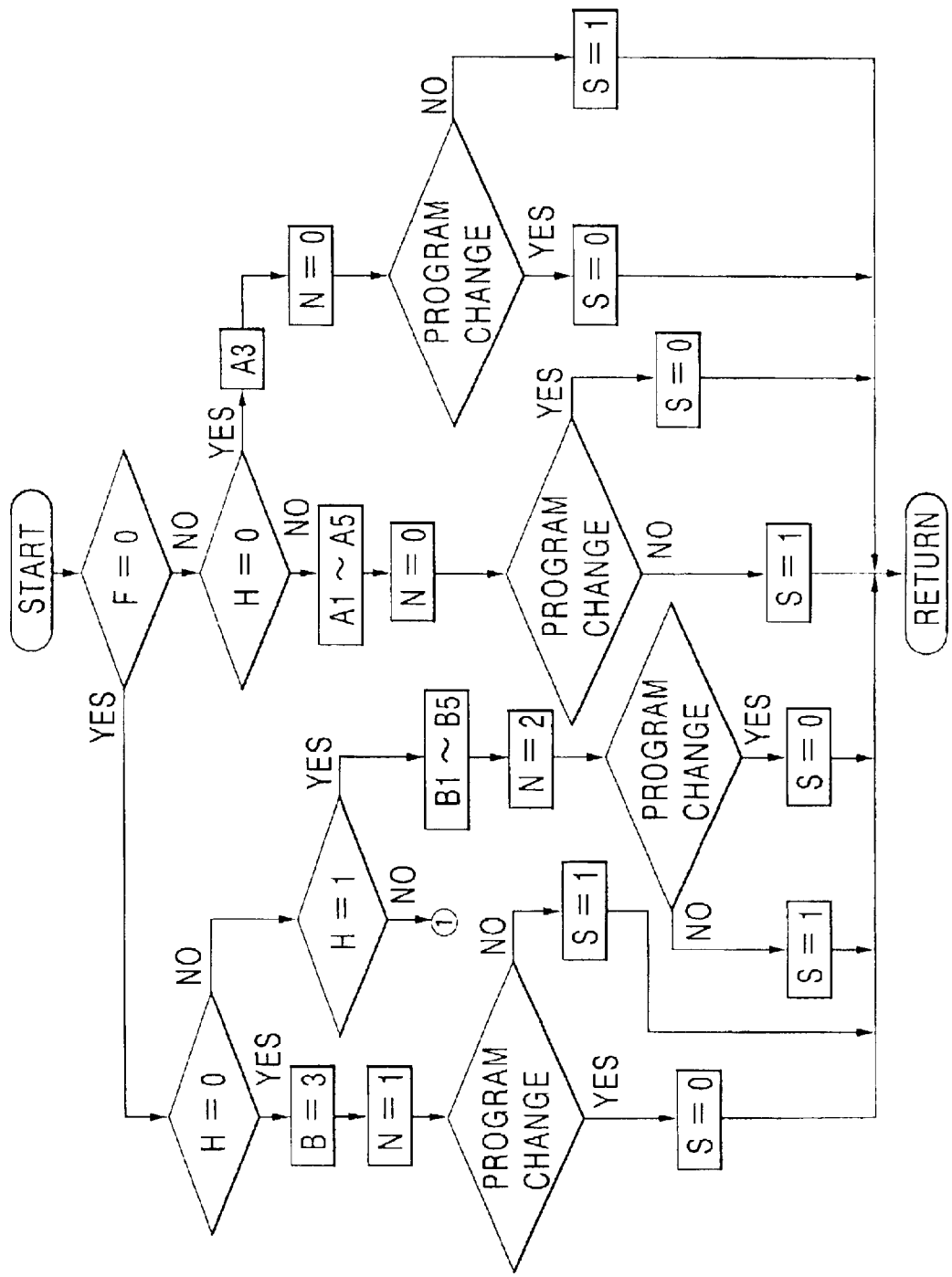
FIGS. 22 and 23 are flowcharts of a program selection subroutine.
Figure 23:
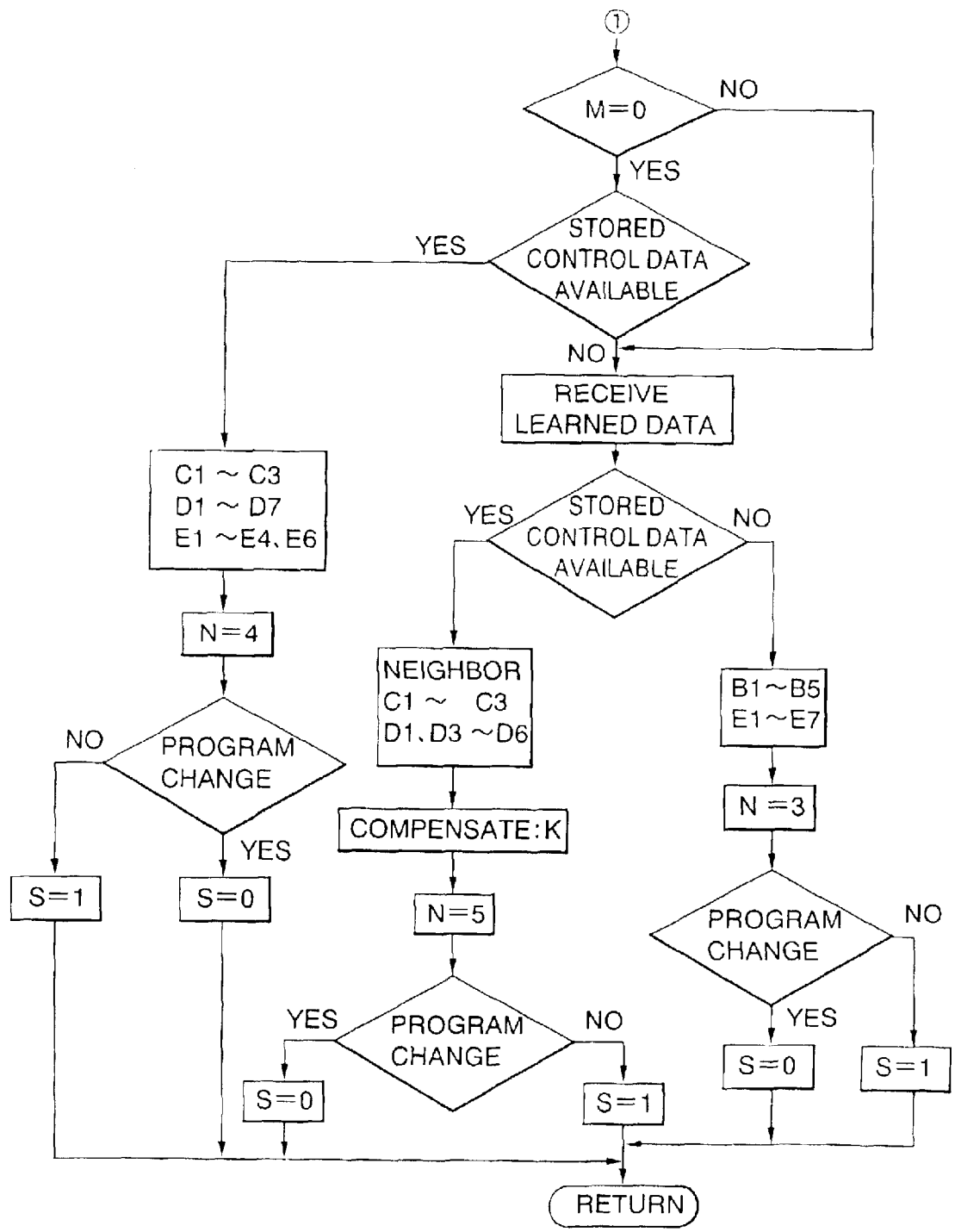

Next, the computer 50 executes a subroutine shown in FIGS. 22 and 23.

In the subroutine, the computer 50 determines whether or not the specific driver is driving the vehicle 1 by checking the value of the flag F. If the flag F is not zero, i.e., if the computer found that the specific driver is not driving the vehicle, the computer 50 next checks whether or not the flag H is zero. If the result is Yes, this means that the driver is not the specific driver and the navigation signal (vehicle location signal) cannot be read out. In this case, the computer 50 accesses the configuration program A3 and sets flag N to a value of 0 since the program A3 is provided for a common situation. The flag N is provided for indicating a program or programs which the computer should access for executing the running characteristic control. If the program to be used has been changed between the preceding cycle and the current cycle, the computer 50 sets the flag S to a value of 0. If not, the flag S is set to a value of 1.

If the flag H is not zero in the case where a driver other than the specific driver drives the vehicle 1, the computer 50 accesses the programs A1 through A5 and sets the flag N to a value of 0. If the program to be used has been changed between the preceding cycle and the current cycle, the computer 50 sets the flag S to a value of 0. If not, flag S is set to a value of 1.

If the flag F is not zero or if the driver is the specific driver, the computer 50 further checks the value of the flag H.

If the flag H is zero, this means that the vehicle is being driven by the specific driver but the navigation signal (vehicle location signal) cannot be read out so that the location of the vehicle 1 cannot be detected properly. In this case, the computer 50 accesses standard program B3 which is the most common one among the programs B1 through B5. The computer 50 sets the flag N at a value of 1. Then, if the program to be used has been changed between the preceding cycle and the current cycle, the computer 50 sets the flag S to a value of 0. If not, the flag S is set to a value of 1. If the flag H is not zero in the case where the vehicle is being driven by the specific driver, the computer 50 checks whether or not the flag H is a value of 1.

If the result is Yes, i.e., if the flag H is a value of 1, this means that the vehicle is being driven by the specific driver but the location of the vehicle cannot be detected properly based on the navigation signal. In this case, the computer 50 accesses the standard programs B 1 through B5 and sets the flag N to a value of 2. If the program to be used has been changed between the preceding cycle and the current cycle, the computer 50 sets the flag S to a value of 0. If not, the flag S is set to a value of 1.

If the value of the flag H is not 1 in the case where the vehicle 1 is being driven by the specific driver, the computer 50 checks whether or not the value of the flag M is 0, i.e., whether the vehicle 1 is within the specific area.

If the result is Yes, i.e., if the flag M is zero, the vehicle 1 is running in the specific area. However, the control data for the unit zone in the hourly period of the day on the day of the week may not yet have been stored in the RAM 52. Therefore, the computer 50 checks whether or not the control data have been stored in the RAM 52. If the result is Yes, i.e., if the control data have been learned and stored in the RAM 52, the computer 50 accesses the learning programs C1 through C3, D1 through D7 and modification programs E1 through E4 and E6 and sets the flag N to a value of 4. Then, if the program to be used has been changed between the preceding cycle and the current cycle, the computer 50 sets the flag S to a value of 0. If not, the flag S is set to a value of 1.

If the result is No, i.e., if the control data for the unit zone in the hourly period of the day on the day of the week have not yet been stored in the RAM 52, the computer 50 accesses the databases 130, 132, 134 and 136 (see FIG. 12) of the information center 102 through the transmitting and receiving device 126 and the network 104 and obtains the accumulated environment data and the learned data (or the average learned data) on other users in the specific area.

If the flag M is not zero in the case where the vehicle 1 is running outside of the specific area, since the control data for the unit zone in the hourly period of the day on the day of the week have not yet been stored in the RAM 52, the computer 50 accesses the databases 130, 132, 134 and 136 (see FIG. 12) of the information center 102 through the transmitting and receiving device 126 and the network 104 and obtains the accumulated environment data and the learned data (or the average learned data) on other users in the specific area.

The computer 50 further checks whether or not the control data, namely the environment data and the learned data (or the average learned data) of other users in the specific, have been accumulated in the databases in the information center.

If the result is No, i.e., the control data are not accumulated in the information center, the computer 50 accesses the standard programs B1 through B5 and modification programs E1 through E7 stored in the RAM 52 and sets the flag N to a value of 3. If the program to be used has been changed between the preceding cycle and the current cycle, the computer 50 sets the flag S to a value of 0. If not, the flag S is set to a value of 1.

If the result is Yes, i.e., if the control data (learned data and environment data) in the specific area have been learned, the computer 50 accesses the programs C1 through C3 and D1, D3 through D6 to modify the control data in the specific area by a gain k in a manner of improving the running stability of the vehicle 1. Then, the computer 50 sets the flag N to a value of 5. This is because the control data in the specific area are considered to be similar to those of the intended unit zone. Thus, the computer 50 utilizes the control data in the specific area for the control of the intended unit zone with regard to the programs D1, D3 through D6. However, it is not considered proper for the control data in the specific area to be used for the control of the intended unit zone with regard to the programs D2 and D7 which learn the places where the brake pedal 31 and the manual switch 34 are operated, respectively. Thus, the computer 50 does not access the programs D2 and D7. Then, if the program to be used has been changed between the preceding cycle and the current cycle, the computer 50 sets the flag S to a value of 0. If not, the flag S is set to a value of 1.

Figure 24:
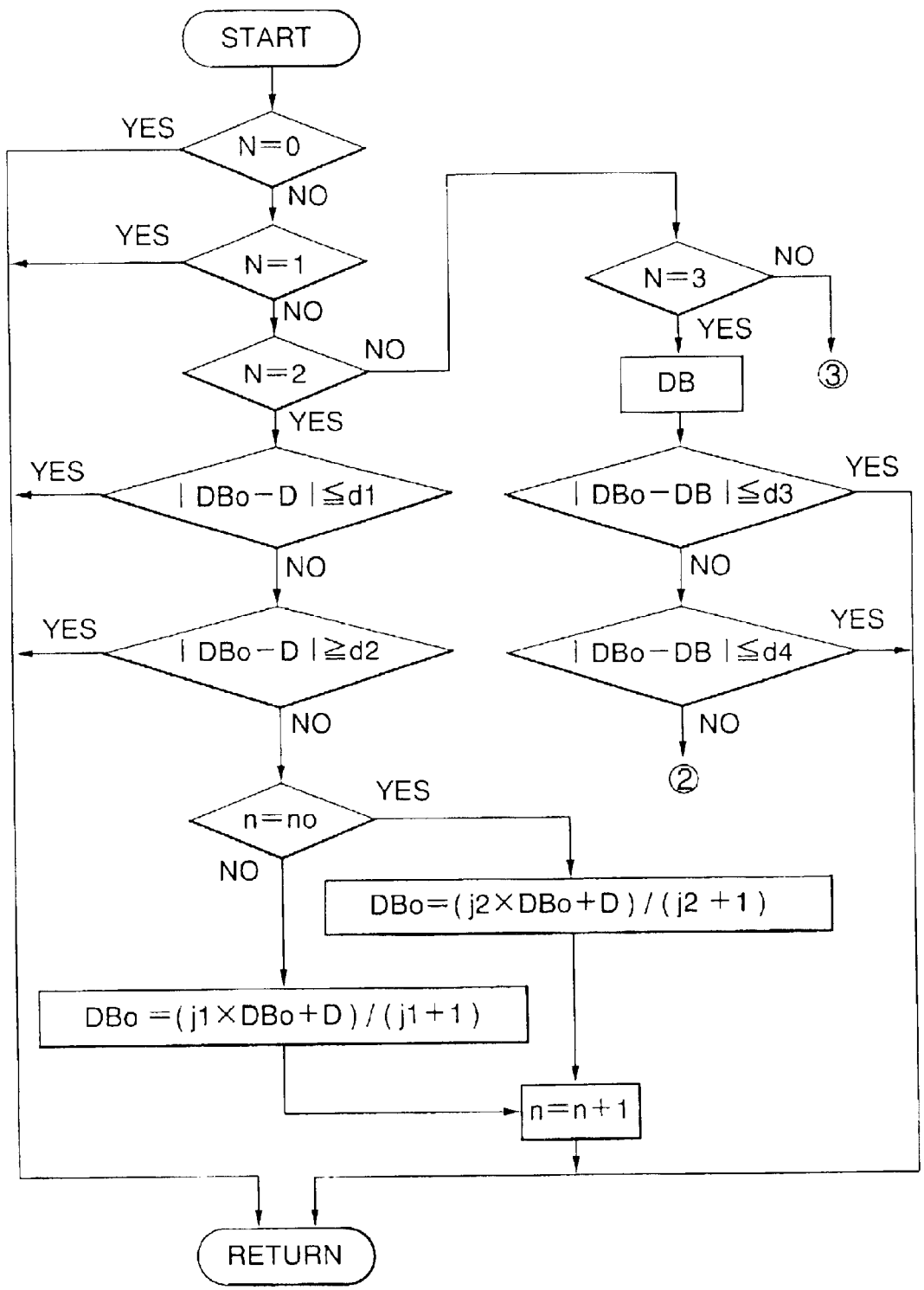
FIGS. 24 and 25 are flowcharts of learning control for the control gains.
Figure 25:
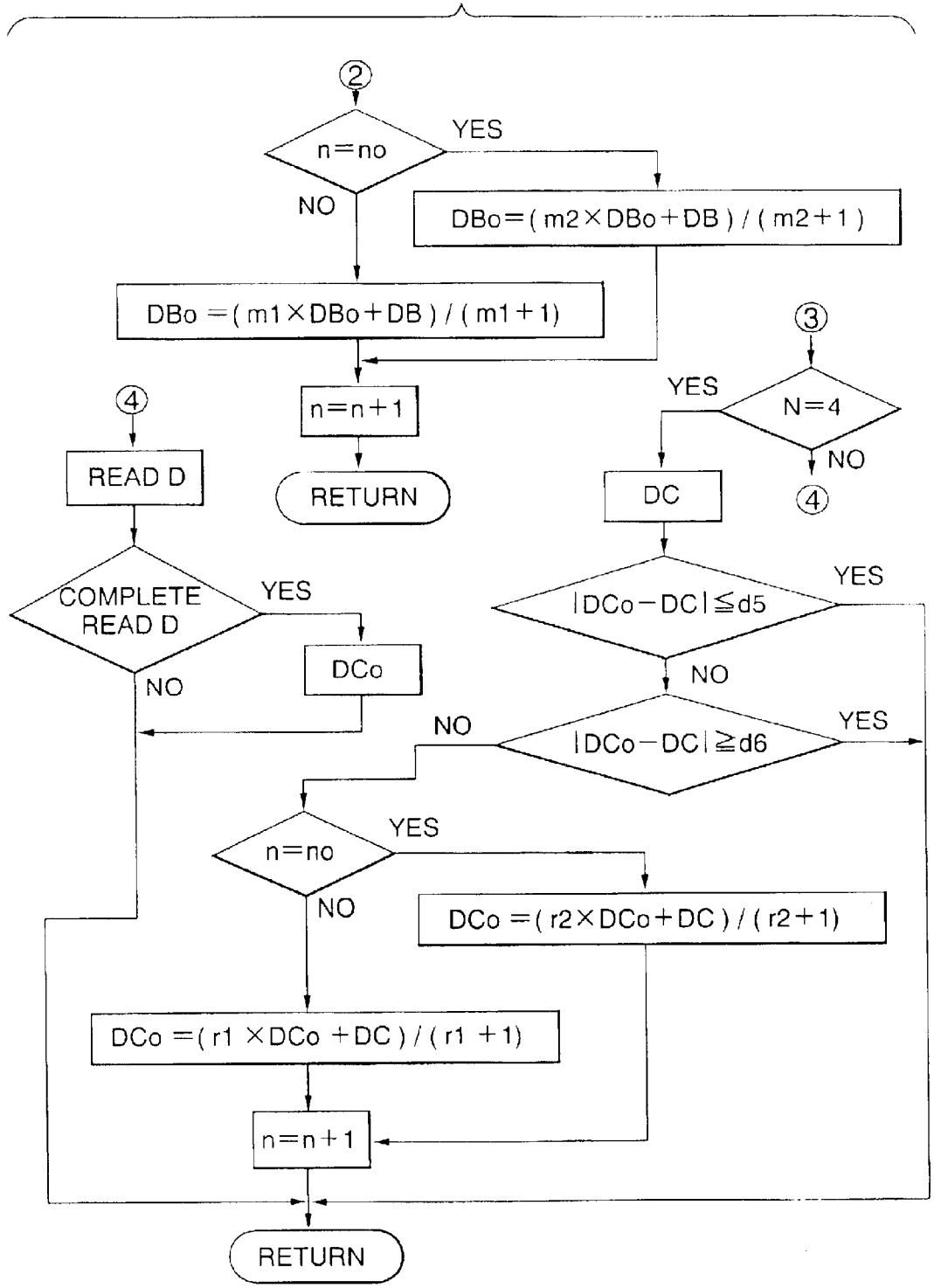

FIGS. 24 and 25 show a flowchart of a learning control subroutine.

The computer 50 checks whether or not the flag N is zero. If the result is Yes, i.e., if the flag N takes a value of 0, the computer does not carry out the learning control since the running characteristic control is made in accordance with the configuration programs A1 through A5 stored in the ROM 51.

If the result is No, i.e., if the flag N does not take a value of 0, the computer 50 further checks whether or not the flag N takes a value of 1. If the result is Yes, i.e., if the flag N takes a value of 1, the computer 50 does not carry out the learning control for the running characteristics of the vehicle 1. In this case, the program B3 is selected temporarily for the running characteristic control. If the value of the flag N is not 1, the computer 50 further checks whether or not the value of the flag N is 2. If the result is Yes, i.e., if the flag N takes a value of 2, the computer 50 reads out the one of the standard programs B1 through B5 corresponding to the area type and reads out the control data $DB_0$ of the active suspension control device 12, the anti-skid brake control device 14, the gear ratio control device 7, the four wheel steer control device 17, traction control device 15, the engine control device 3 and the power steering device 9 stored in the RAM 52. Then, computer 50 reads running data D and judges whether or not the absolute value of the difference between the control $DB_0$ and the running data D is not greater than a predetermined value d1 for each of the control devices.

If the result is Yes, i.e., if the difference is not greater than the predetermined value d1, the computer 50 does not learn the running data D since the stored data $DB_0$ are good enough to satisfy the control. If the result is No, i.e., if the difference is greater than the predetermined value d1, the computer 50 further judges whether or not the difference is not smaller than another predetermined value d2 (d2>d1).

If the result is Yes, i.e., if the difference is not smaller than the predetermined value d2, the computer 50 does learn the running data D because the running data D are reliable. If the result is No, i.e., if the difference is smaller than the value d2, the computer 50 judges whether or not the number of renewal times n has reached a predetermined number no.

If the number of renewal times has not reached the number no, the computer 50 calculates new control data $DB_0$ in accordance with the following formula, which produces a relatively great modification:

$$DB_0=(j1*DB_0+D)/(j1+1),$$

where j1 is a predetermined coefficient, for example 10000. Then, the number of renewal times n is calculated as n=n+1 and stored in the RAM 52. The calculated value of the control data $DB_0$ is newly stored in the RAM 52 in place of the existing control data $DB_0$. In other words, the new control data $DB_0$ is learned.

If the number of renewal times has reached the predetermined value no, the computer 50 calculates new control data in accordance with the following formula, which produces a relatively small modification:

$$DB_0=(j2*DB_0+D)/(j2+1),$$

wherein j2 is a predetermined coefficient (j1<j2), for example 15000. Then, the number of renewal times n is increased by one (n=1+1) and stored in the RAM 52.

If the flag N does not take a value of 2, the computer 50 further checks whether or not the value of the flag N is 3.

If the result is Yes, i.e., if the flag N takes a value of 3, the computer 50 reads out the one of the standard programs B1 through B5 which corresponds to the area type where the vehicle is running. Then, the computer 50 reads out the control data $DB_0$ of the standard program selected and reads running control data D. The computer 50 modifies the control data $DB_0$ based on the running data D in accordance with the modification programs E5 through E7 to get modified data DB. Thereafter, the computer 50 judges whether or not the absolute value of the difference between the control data $DB_0$ and modified data DB is not greater than a predetermined value d3 for each of the control devices.

If the result is Yes, i.e., if the difference is not greater than the value d3, the computer 50 does not learn the modified data DB. If the result is No, i.e., if the difference is greater than the value d3, the computer 50 further judges whether or not the difference between the values $DB_0$ and DB is not smaller than a predetermined value d4 for each of the control devices (d4>d3). If the result is Yes, i.e., if the difference is not smaller than the value d4, the computer 50 does not learn the modified data DB.

If the result is No, i.e., if the difference is smaller than the value d4, the computer 50 further judges whether or not the number of renewal times n has reached the value $n_0$.

If the result is No, the computer 50 carries out the learning control in accordance with the following formula, which produces a relatively great modification:

$$DB_0=(m1*DB_0+DB)/(m1+1),$$

where m1 is a predetermined coefficient, for example 10000. Then, the number of renewal times n is counted as n=n+.

If the number of renewal times n has reached the predetermined value $n_0$, the computer 50 calculates new control data in accordance with the following formula, which produces a relatively small modification:

$$DB_0=(m2*DB_0+DB)/(m2+1),$$

where m2 is a predetermined coefficient (m1<m2), for example 15000. Then, the number of renewal times n is increased by one (n=n+1) and stored in the RAM 52.

If the flag N does not take a value of 3, the computer 50 checks whether or not the value of the flag N is 4. If the result is Yes, i.e., if the value of the flag N is 4, this means that the vehicle 1 is in the specific area and the control data for every unit zone have already been stored in the RAM 52.

The computer 50 reads out the learning programs C1 through C3 and D1 through D7 and calculates the control data $DC_0$ of the programs C1 through C3 based on the control data.

The computer 50 reads the running data D and modifies the control data $DC_0$ in accordance with the programs C1 through C3 and D1 though D7 to get the control data DC. Then, the computer 50 judges whether or not the absolute value of the difference between the values $DC_0$ and DC is not greater than a predetermined value d5. If the result is Yes, i.e., if the difference is not greater than the value d5, the computer 50 does not learn the control data DC. If the result is No, i.e., if the difference is greater than the value d5, the computer 50 further judges whether or not the difference is not smaller than a predetermined value d6 (d6>d5).

If the result is Yes, i.e., if the difference is not smaller than the value d6, the computer 50 does not learn the modified data DC.

If the result is No, i.e., if the difference is smaller than the value d6, the computer 50 further judges whether or not the number of renewal times n has reached the value $n_0$.

If the result is No, the computer 50 carries out the learning control in accordance with the following formula, which produces a relatively great modification:

$$DB_0=(r1*DC_0+DC)/(r1+1),$$

where r11 is a predetermined coefficient, for example 100. Then, the number of renewal times n is counted as n=n+1.

If the number of renewal times n reaches the predetermined value $n_0$, the computer 50 calculates new control data in accordance with the following formula which produces a relatively small modification:

$$DB_0=(r2*DC_0+DC)(r2+1),$$

where r2 is a predetermined coefficient (r1<r2), for example 150. Then, the number of renewal times n is increased by one (n=n+1) and stored in the RAM 52.

If the flag N does not take a value of 4, the value of flag N is 5.

In this case, the computer 50 reads the running data D.

As for the learning programs D1, D3 through D6, when the vehicle 1 has run on the same unit zone p times, such as 10 times or 50 times, on the same day of the week in the same hourly period of the day, the number p of the running data D can be obtained. The control data $DC_0$ are obtained by summing the running data D, dividing the sum by the number p and storing the quotient in the RAM 52.

The running data D are obtained by taking an average of the running data or actual control data for the control devices controlling the running characteristics of the vehicle 1 based on signals from the integrating meter 41 and other sensors in a plurality of unit zones. The unit zone is defined as a predetermined running distance of the vehicle 1, such a 1 km, with an overlapped portion of, for example, 100 m between the adjacent unit zones or a predetermined running time, such as 10 minutes running time, with an overlapped portion of, for example 1 minute, between the adjacent unit zones.

The control data $DC_0$ are obtained using the learning programs C1 through C3 and D1 through D7. The modification data DC is obtained based on the running data D using the learning program C1 through C3 and D1 through D7. The method of obtaining the running data D will now be explained in detail with regard to the ACS.

Figure 26:
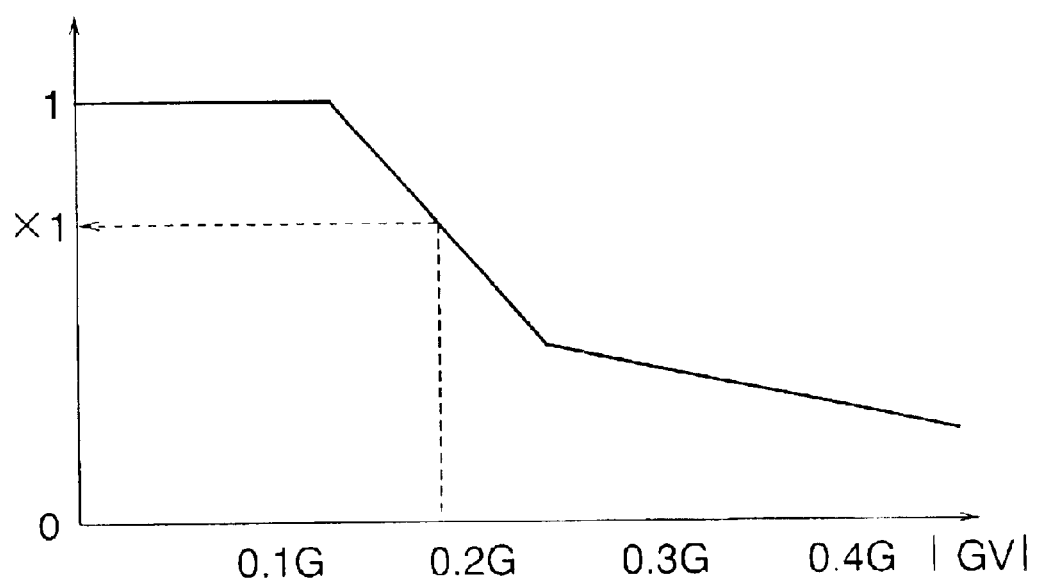
FIG. 26 is a graphical representation of a map for obtaining modification data in connection with vertical acceleration of the vehicle.
Figure 27:
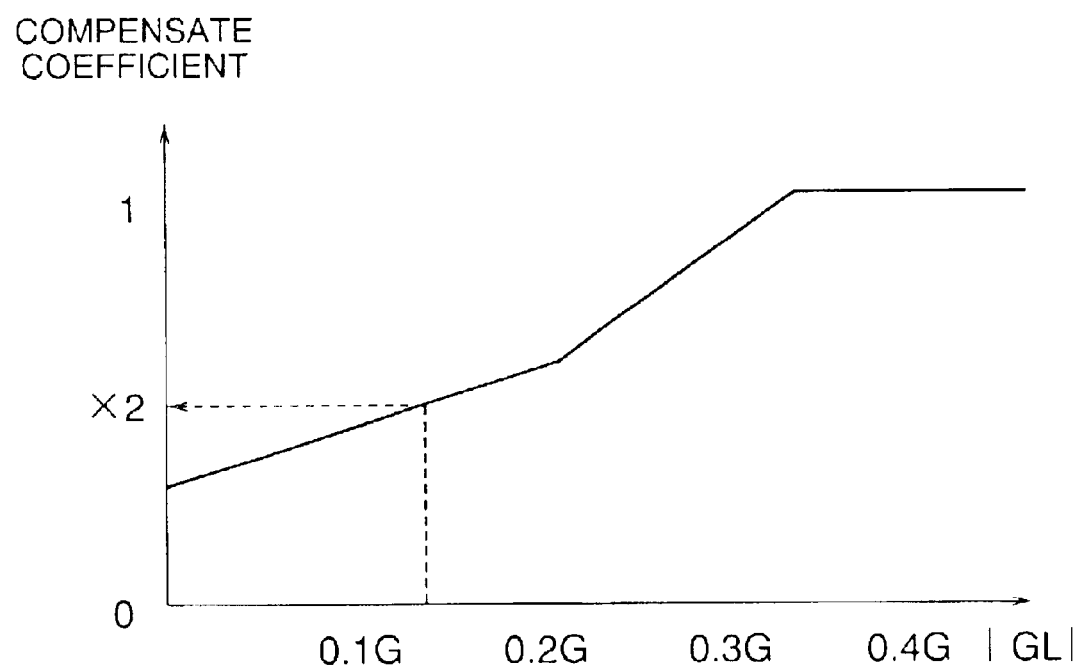
FIG. 27 a graphical representation of a map for obtaining modification data in connection with lateral acceleration of the vehicle.

FIGS. 26 and 27 show maps used when modifying the control data for the ACS using the learning programs C1 through C3 for learning terrain condition. FIG. 26 is a map showing a relationship between the vertical acceleration GV and modification data. FIG. 27 is a map showing a relationship between the lateral acceleration GL and the modification data These maps are stored in the ROM 51.

The modification data x1 for the program C1 is obtained from the map shown in FIG. 26 based on the signal from the vertical acceleration sensor 47. In FIG. 26, data value 1 corresponds to the hardest suspension characteristic, and data value 0 corresponds to the softest suspension characteristic.

The modification data x2 is obtained from the map shown in FIG. 27 based on the signal from the lateral acceleration sensor 46.

It will be understood that the ACS control data is not modified by the program C3. The modification data Xc for the programs C1 through C3 is calculated based on the data x1 and x2 as:

$$Xc=(x1+x2)/2.$$

The modification data Xd is similarly obtained from a map (not shown).

The modification data DC is obtained from the following formula based on the data Xc and Xd:

$$DC=(K1*Xc+K2*Xd)/(K1+K2).$$

K1, K2 are weight coefficients (K1<K2). As mentioned earlier, the computer 50 compares the data $DC_0$ obtained in the preceding cycle with the data DC obtained by the above procedure so as to determine whether the learning control should be made.

Likewise, the modification data DB for the standard programs B1 through B5 are obtained based on the running data D using the modification programs E5 through E7.

Figure 28:
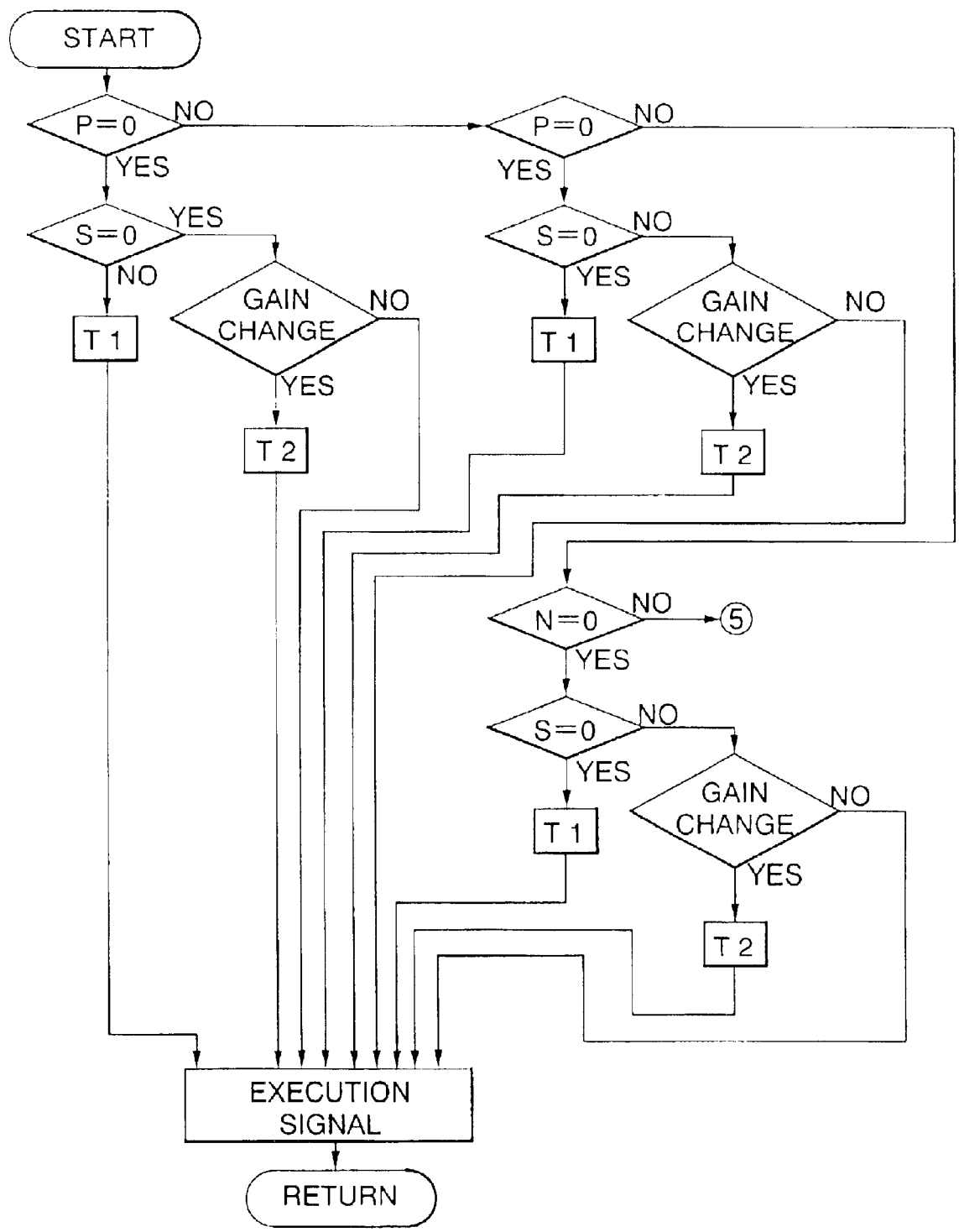
FIGS. 28, 29 and 30 are a flowchart of a subroutine for execution of learning control.
Figure 29:
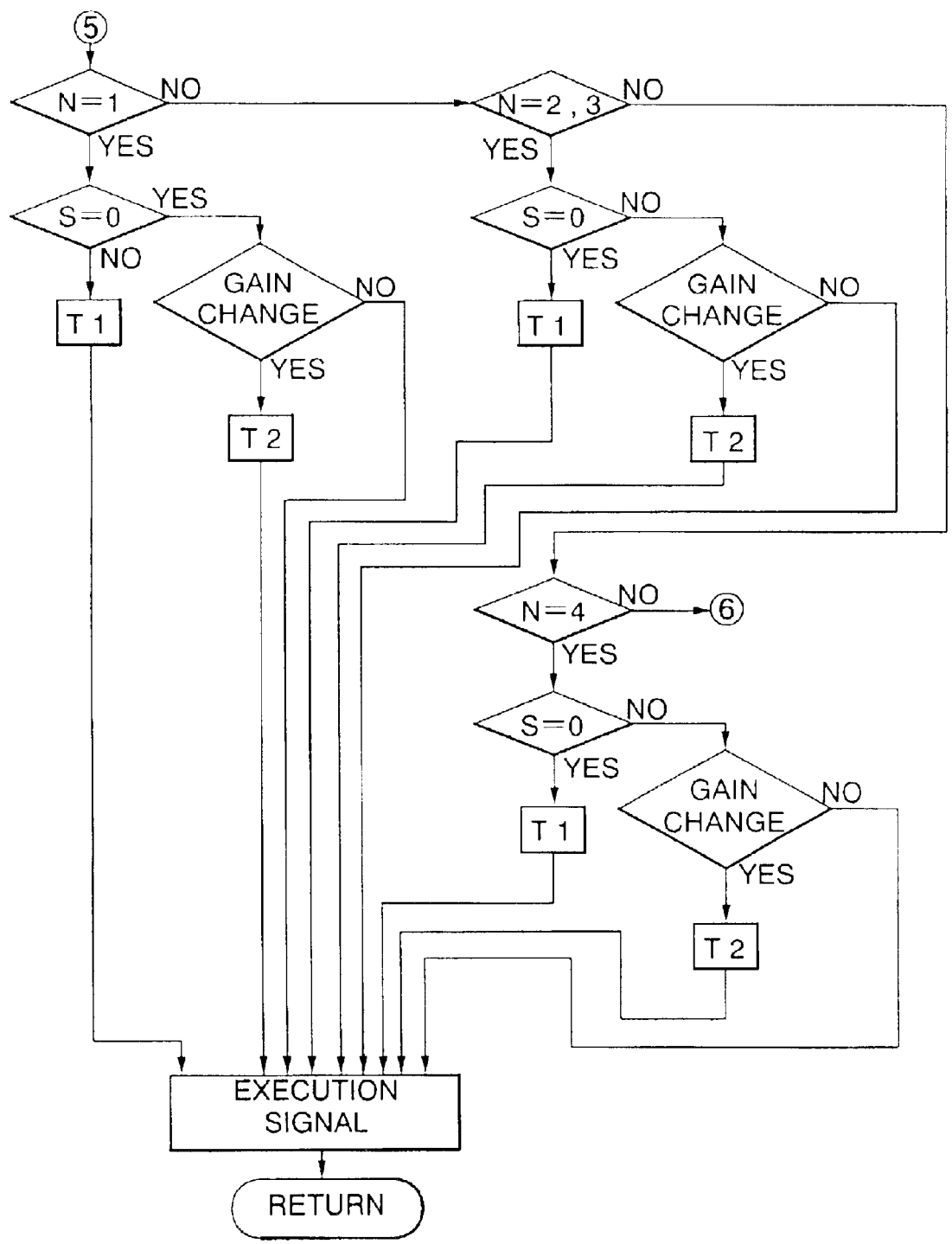
Figure 30:
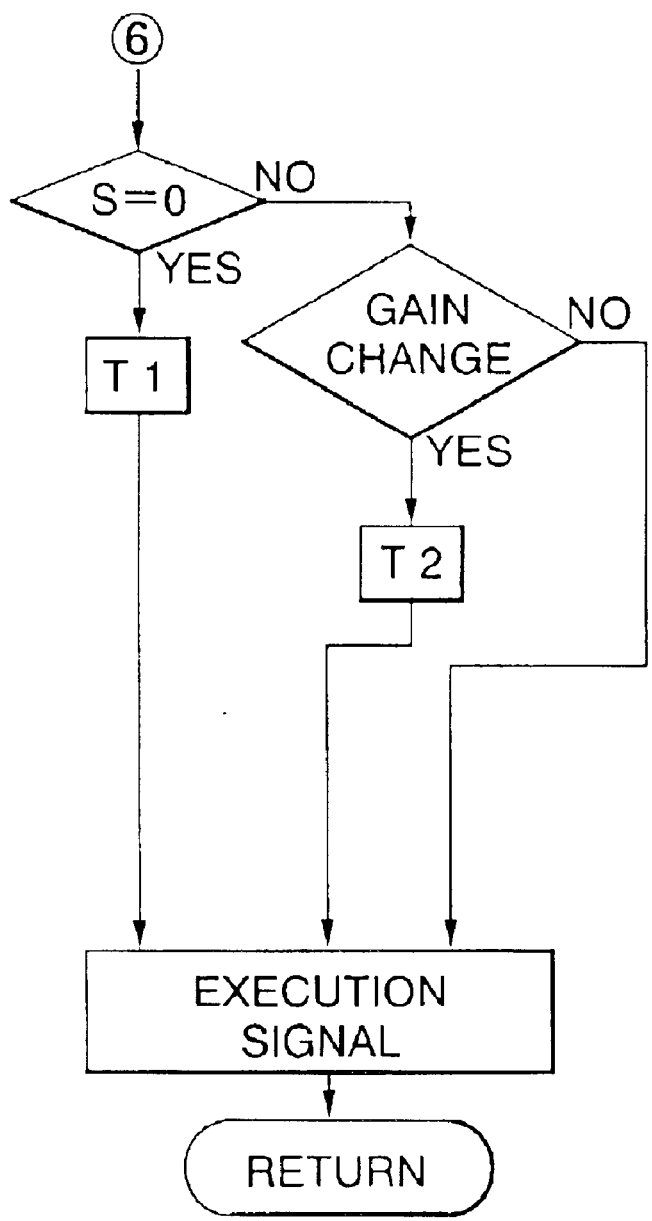

FIGS. 28, 29 and 30 show a flowchart of a subroutine for execution control of control.

In FIGS. 28, 29 and 30, the computer 50 checks whether or not the value of the flag P is 0.

If the result is Yes, i.e., if the flag P is 0, it is considered that the control should be made in accordance with the configuration program A7. In this case, the computer 50 further checks whether or not the value of the flag S is 0. If the flag S is 0, it is considered that the driver has changed and the program has changed between the preceding cycle and the current cycle. In order to prevent an abrupt change in the running characteristics of the vehicle, the computer 50 increments the control time period T by T1. Then, the computer 50 produces a control execution signal so that the control gains gradually reach the values obtained in the current cycle after the control time period T has passed.

If the flag S is not 0, the computer 50 further judges whether or not the control gains have changed between the preceding cycle and the current cycle. If the result is Yes, i.e., if the control gains have changed, the computer 50 increments the control time period T by T2. Then, the computer 50 produces the execution control signal in such a manner that the control gains reach the target values obtained in the current cycle after the control time period T has passed.

If the flag P is not 0, the computer 50 further checks whether or not the flag P is 1. If the flag P is 1, it is considered that the vehicle is running on a low friction road and that the running stability should be obtained in accordance with the configuration program A6. The computer then checks whether or not the flag S is 0. If the flag S is 0, it is considered that the driver has changed and the program to be used has changed between the preceding cycle and the current cycle. In order to prevent an abrupt change in the running characteristics, the computer 50 increments the control time period T by T1. If the flag S is not 0, the computer 50 increments the control time period by T2.

The computer 50 produces the execution control signal in the same manner as aforementioned.

If the flag P is not 1, the computer checks whether or not the flag N is 0. If the flag N is 0, it is considered that the control should be made in accordance with the configuration programs A1 through A5 stored in the ROM 51. The computer 50 further checks whether or not the flag S is 0. If the flag is 0, the computer 50 increments the control time period T by T1. If the flag S is not 0, the control time period T is increased by the increment T2. Then, computer 50 produces the execution control signal in a similar manner in accordance with the configuration programs A1 through A5.

If the flag N is not 0, the computer 50 further checks whether or not the flag N is 1. If the flag N is 1, the running characteristic control is made in accordance with the standard program B3. Then, the computer 50 further checks whether or not the flag S is 0. If the flag S is 0, the computer 50 increases the control time period T by the increment T1. If the flag S is not 0, the computer 50 uniformly modifies the control gains obtained based on the modification programs E1 through E4 in accordance with the standard program B3 as shown in FIG. 7 so as to calculate the control gains for the respective control devices.

When the computer 50 detects from the clock 40 that the vehicle is running at night, it modifies the control data DB for the respective control devices of the standard program corresponding to the area type where the vehicle 1 is running. If the computer 50 detects that the traffic condition is bad based on the navigation signal and vehicle speed signal from the vehicle speed sensor 43, the data DB is modified. Similar modification is made if the computer detects from the operation of the wiper that it is raining or snowing and if the computer finds that the continuous running time is very long based on the signal from the meter 41 and clock 40.

Then, the computer judges whether or not the control gains have changed between the preceding cycle and the current cycle.

If the control gains have changed, the control time period T is increased by the time T2 for suppressing an abrupt change in the running characteristics of the vehicle 1. Then, the computer 50 produces a execution signal that produces gradual change in the control gains.

If the flag N is not 1, it is checked whether the value of the flag N is 2 or 3, as shown in FIG. 29.

If the flag N is 2 or 3, the computer 50 starts the control in accordance with the standard programs B1 through B5. In this case, the computer 50 checks whether or not the flag S is 0. If the flag S is 0, the computer 50 increases the control time period T by the increment T1. If the flag S is not 0, the computer 50 uniformly modifies the control gains based on the modification programs E1 through E4 in accordance with one of the standard programs B1 through B5 as shown in FIG. 8. Then, the computer 50 judges whether or not the control gains have changed between the preceding cycle and the current cycle.

Then, the computer 50 increases the control time period T by the increment T2. Then, the computer 50 produces the execution signal for the control devices as aforementioned.

If the flag N is neither 2 nor 3, the computer 50 checks whether or not the flag N is 4.

If the flag N is 4, the computer 50 starts the control in accordance with the programs C1 through C3 and D1 through D7.

In this control, the computer checks the value of the flag S. If the flag S is 0, the computer 50 increases the control time period T, which is stored in the timer of the respective control devices, by the increment T1. If the flag S is not 0, the computer 50 uniformly modifies the control gains as aforementioned, as shown in FIG. 8. Then, the computer 50 increases the control time period T by the increment T2 if the control gains have changed between the preceding cycle and the current cycle.

If the flag N is not 4, the computer 50 executes the running characteristic control utilizing the control data for the neighborhood unit zone with regard to the programs C1 through C3 and D1, D3 through D6. However, this control does not apply the programs D2, D7. In these programs, the control data are learned in connection with places where the brake pedal 31 and the manual switch 34 have been operated. Thus, it is unlikely that the control data of the neighborhood unit zone can be properly employed for the control of the intended area.

Next the computer 50 checks the value of the flag S. If the flag S is 0, the control time T stored in the timer of the control device is increased by the time T1. If the flag S is not 0, the computer 50 uniformly modifies the control data for the neighborhood unit zone to obtain the control gains. Then, the computer 50 checks for change in the control gains. If the control gains have changed, the computer 50 increases the control time T by the time T2 as aforementioned. Then, the execution signal is produced for executing the running characteristic control of the vehicle.

According to the illustrated embodiment, the configuration programs A1 through A5 are provided with control gains corresponding to the area type where the vehicle is running, such as a metropolis area, urban area suburban area, mountain area and freeway area. The configuration program A6 is provided with the control gains used when the lateral acceleration of the vehicle GL is greater than the predetermined value GL0. The configuration program A7 is used when the vehicle runs on a low friction road. The standard programs B1 through B5 learn the running conditions corresponding to the terrains when the specific driver drives the vehicle, as aforementioned. The programs C1 through C3 and D1 through D7 learn the running condition when the specific driver drives within the specific area where the vehicle is located within a predetermined distance L0 from a predetermined place, such as the owner's house or a dealer's office. The modification programs modify the standard programs BI through B5, C1 through C3 and D1 through D7. Thus, when the specific driver drives in the specific area, for example, during work, suitable control gains of the running characteristics will he provided through the learning programs C1 through C3 and D1 through D7 which learn the terrain within the specific area and the specific driver's operation for every unit zone. When the specific driver drives the vehicle 1 in an area other than the specific area, the standard programs B1 through B5 modified from the configuration programs A1 through A5 by the programs E1 through E7 in accordance with the area type provide satisfactory control gains for controlling the running characteristics. When a driver other than the specific driver drives the vehicle 1, the configuration programs A1 through A5 provide desirable control gains corresponding to the area type. When the lateral acceleration GL of the vehicle 1 is greater than the value GL0, the configuration program A6 is used for controlling the control gains of the running characteristics prior to the other programs. Further, when the vehicle runs on a low friction road, the configuration program A7 is used for controlling the control gains of the running characteristics of the vehicle prior to the other programs so that running stability can be obtained. Further, when a driver other than the specific driver drives, the learning control is not carried out. This prevents the control gains in the programs that have been changed to correspond to the operations of the specific driver from being changed in an unfavorable direction.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A server for changing control gains of a vehicle comprising:
   first receiving means for receiving environment data obtained by vehicles of a plurality of users running in specific areas;
   second receiving means for receiving learned data obtained by a plurality of users operating vehicles;
   data accumulating means for accumulating the environment data and the learned data; and
   data transmitting means for fetching environment data and learned data necessary to produce control gains from among the accumulated environment data and the learned data, and transmitting the fetched environment data and learned data to a user requesting the environment data and the learned data so that, in a vehicle of the user, the control gains are newly produced and previously produced control gains are changed to the newly produced ones.

2. A server according to claim 1, wherein said data accumulating means accumulates the learned data separately on the users, and accumulates the environment data separately on locations where the environment data are obtained.

3. A server according to claim 2, wherein said environment data accumulated in the data accumulating means are accessible to any user.

4. A server according to claim 1, wherein a user having an ID can access only his own said learned data accumulated in the data accumulating means, and an unauthorized access to said learned data by a third party is prohibited.

5. A server according to claim 1, wherein said environment data and learned data transmitted by the data transmitting means contain at least average learned data obtained by averaging the learned data of a plurality of users separately on predetermined characteristics.

6. A server according to claim 1, wherein said data transmitting means transmits the environment data and the learned data together with locations and times where and when the environment data and the learned data are obtained.

7. A server according to claim 1, wherein said server concludes a fee-based contract with the user.

8. A server according to claim 7, wherein said fee-based contract provides that the user transmits his environment data and learned data to the server without charge, and receives the environment data and learned data from the server with a charge.

9. A server according to claim 7, wherein said fee-based contract provides that, when the user permits transmission of his environment data and learned data, the fee in the fee-based contract is reduced.

10. A server according to claim 1, wherein said environment data accumulated in the data accumulating means can be supplied to a third party.

11. A server for changing control gains of a vehicle comprising:
    first receiving means for receiving environment data obtained by vehicles of a plurality of users running in specific areas;
    second receiving means for receiving learned data obtained by a plurality of users operating vehicles;
    data accumulating means for accumulating the environment data and the learned data;
    control gain producing means for producing control gains of control devices of a vehicle based on the accumulated environment data and learned data; and
    control gain transmitting means for transmitting the control gains to a user requesting the control gains so that, in a vehicle of the user, previously produced control gains are changed to the transmitted ones.

12. A method for changing control gains of a vehicle comprising the steps of:
    receiving environment data obtained by vehicles of a plurality of users running in specific areas;
    receiving means for receiving learned data obtained by a plurality of users operating vehicles;
    accumulating the environment data and the learned data; and
    fetching environment data and learned data necessary to produce control gains from among the accumulated environment data and the learned data, and transmitting the fetched environment data and learned data to a user requesting the environment data and the learned data so that, in a vehicle of the user, the control gains are newly produced and previously produced control gains are changed to the newly produced ones.

13. A method for changing control gains of a vehicle comprising:
    receiving environment data obtained by vehicles of a plurality of users running in specific areas;
    receiving learned data obtained by a plurality of users operating vehicles;
    accumulating the environment data and the learned data;
    producing control gains of control devices of a vehicle based on the accumulated environment data and learned data; and
    transmitting the control gains to a user requesting the control gains so that, in a vehicle of the user, previously produced control gains are changed to the transmitted ones.

14. A program for controlling a computer of a server for changing control gains of a vehicle, the program comprising:
    instructions for receiving environment data obtained by vehicles of a plurality of users running in specific areas;
    instructions for receiving means for receiving learned data obtained by a plurality of users operating vehicles;
    instructions for accumulating the environment data and the learned data; and
    instructions for fetching environment data and learned data necessary to produce control gains from among the accumulated environment data and the learned data, and transmitting the fetched environment data and learned data to a user requesting the environment data and the learned data so that, in a vehicle of the user, the control gains are newly produced and previously produced control gains are changed to the newly produced ones.

15. A program for controlling a computer of a server for changing control gains of a vehicle, the program comprising:
    instructions for receiving environment data obtained by vehicles of a plurality of users running in specific areas;
    instructions for receiving learned data obtained by a plurality of users operating vehicles;
    instructions for accumulating the environment data and the learned data;

instructions for producing control gains of control devices of a vehicle based on the accumulated environment data and learned data; and instructions for transmitting the control gains to a user requesting the control gains so that, in a vehicle of the user, previously produced control gains are changed to the transmitted ones.

16. A server for changing control gains of a vehicle when a specific user operates a vehicle other than a vehicle owned by the specific user, the server comprising:

receiving means for receiving learned data obtained by a plurality of users operating their own vehicles;

data accumulating means for accumulating the learned data; and means for providing the vehicle other than the vehicle owned by the specific user with predetermined learned data so as to change control gains in the vehicle other than the vehicle owned by the specific user.

17. A server according to claim 16, wherein said server further comprises a rental car reservation system, and the vehicle other than the vehicle owned by the specific user is a rental car.

18. A server according to claim 16, wherein, said server further comprises confirmation means for, when the vehicle other than the vehicle owned by the specific user is not a rental car but a vehicle owned by another user, confirming that the specific user has obtained permission to use the vehicle owned by the other user.

19. A server according to claim 16, wherein the learned data providing means provides the learned data of the specific user as the predetermined learned data when the learned data of the specific user is accumulated in the data accumulating means.

20. A server according to claim 16, wherein the learned data providing means provides the learned data of other users as the predetermined learned data when the learned data of the specific user is not accumulated in the data accumulating means.

21. A server according to claim 20, wherein the learned data of other users provided by the learned data providing means are average learned data obtained by averaging the learned data of a plurality of users separately on predetermined characteristics.

22. A server according to claim 16, wherein the predetermined learned data provided by the learned data providing means are obtained by correcting the received learned data by predetermined values on the safe side.

23. A server according to claim 16, wherein the learned data providing means provides the learned data corrected based on difference in vehicle type between the vehicle of the specific user and the vehicle other than the vehicle owned by the specific user.

24. A server according to claim 16, wherein said learned data receiving means does not receive the learned data obtained when the specific user operates the vehicle other than the vehicle owned by the specific user.

25. A server according to claim 16, wherein the server further comprises second receiving means for receiving environment data obtained by a plurality of users operating their own vehicles in specific areas, the vehicles including the vehicle other than the vehicle owned by the specific user.

26. A method for changing control gains of a vehicle when a specific user operates a vehicle other than a vehicle owned by the specific user, the method comprising steps of:

receiving learned data obtained by a plurality of users operating their own vehicles;

accumulating the learned data; and providing the vehicle other than the vehicle owned by the specific user with predetermined learned data so as to change control gains in the vehicle other than the vehicle owned by the specific user.

27. A program for controlling a computer of a server for changing control gains of a vehicle when a specific user operates a vehicle other than the vehicle owned by the specific user, the program comprising:

instructions for receiving learned data obtained by a plurality of users operating their own vehicles;

instructions for accumulating the learned data; and instructions for providing the vehicle other than the vehicle owned by the specific user with predetermined learned data so as to change control gains in the vehicle other than the vehicle owned by the specific user.

28. A server for changing control gains of a vehicle when a user having a specific vehicle purchases another vehicle and replaces the specific vehicle with the other vehicle, the server comprising:

receiving means for receiving learned data, regarding control gains, obtained by the user operating the specific vehicle;

data accumulating means for accumulating the learned data; and means for providing the other vehicle with predetermined learned data based on the accumulated learned data so as to change control gains in the other vehicle.

29. A server according to claim 28, wherein said learned data providing means provides a vehicle manufacturer or a vehicle dealer of the other vehicle with the predetermined learned data, and the vehicle manufacturer or the vehicle dealer stores the predetermined learned data in the other vehicle.

30. A server according to claim 28, wherein the predetermined learned data provided by the learned data providing means are obtained by correcting the received learned data by predetermined values on the safe side.

31. A server according to claim 28, wherein the learned data providing means provides the learned data corrected based on difference in vehicle type between the specific vehicle and the other vehicle.

32. A server according to claim 31, wherein said learned data accumulating means accumulates the corrected learned data.

33. A method for changing control gains of a vehicle when a user having a specific vehicle purchases another vehicle and replaces the specific vehicle with the other vehicle, the method comprising the steps of:

receiving learned data, regarding control gains, obtained by the user operating the specific vehicle;

accumulating the learned data; and providing the other vehicle with predetermined learned data based on the accumulated learned data so as to change control gains in the other vehicle.

34. A program for controlling a computer of a server for changing control gains of a vehicle when a user having a specific vehicle purchases another vehicle and replaces the specific vehicle with the other vehicle, the program comprising:

instructions for receiving learned data, regarding control gains, obtained by the user operating the specific vehicle;

instructions for accumulating the learned data; and instructions for providing the other vehicle with predetermined learned data based on the accumulated learned data so as to change control gains in the other vehicle.

* * * * *